(12) United States Patent
Yajima et al.

(10) Patent No.: US 10,567,401 B2
(45) Date of Patent: Feb. 18, 2020

(54) DEVICE AND METHOD FOR DETECTING ATTACK IN NETWORK

(71) Applicant: FUJITSU LIMITED, Kawasaki-shi, Kanagawa (JP)

(72) Inventors: Jun Yajima, Kawasaki (JP); Takayuki Hasebe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 96 days.

(21) Appl. No.: 15/813,864

(22) Filed: Nov. 15, 2017

(65) Prior Publication Data

US 2018/0152464 A1 May 31, 2018

(30) Foreign Application Priority Data

Nov. 29, 2016 (JP) .................. 2016-230868

(51) Int. Cl.
*H04L 29/06* (2006.01)
*H04L 12/40* (2006.01)
*H04L 9/12* (2006.01)
*H04L 29/08* (2006.01)

(52) U.S. Cl.
CPC .......... *H04L 63/1416* (2013.01); *H04L 9/12* (2013.01); *H04L 12/40006* (2013.01); *H04L 63/20* (2013.01); *H04L 67/12* (2013.01); *H04L 12/40* (2013.01); *H04L 2012/40215* (2013.01); *H04L 2012/40273* (2013.01)

(58) Field of Classification Search
CPC . H04L 63/1416; H04L 9/12; H04L 12/40006; H04L 63/20; H04L 67/12; H04L 12/40; H04L 2012/40215; H04L 2012/40273
See application file for complete search history.

(56) References Cited

U.S. PATENT DOCUMENTS

| 6,996,115 | B1 * | 2/2006 | Budde ................ H04L 12/403 370/240 |
| 8,542,069 | B2 * | 9/2013 | Kelling ................ H04L 7/033 331/172 |
| 9,241,016 | B2 * | 1/2016 | Barth ................ H04L 63/0492 |
| 9,705,697 | B1 * | 7/2017 | Tomita ................ H04B 15/005 |

(Continued)

FOREIGN PATENT DOCUMENTS

WO    WO 2015/170451 A1    11/2015

*Primary Examiner* — Ghodrat Jamshidi
(74) *Attorney, Agent, or Firm* — Staas & Halsey LLP

(57) ABSTRACT

An attack detection device includes a transceiver and a processor. The transceiver receives a message from a communication device in a network. The processor calculates, according to a reception time of a first message in periodic messages that are periodically transmitted in a specified transmission cycle in the network, a reception range for a target message in the periodic messages that are received after the first message by the transceiver. When the transceiver receives a second message that is associated with information indicating that the second message is transmitted at a time interval shorter than the transmission cycle outside of the reception range after the reception time of the first message, the processor updates the reception range for a target message in the periodic messages that are received after the second message by the transceiver according to a reception time of the second message and the transmission cycle.

9 Claims, 18 Drawing Sheets

(56) References Cited

U.S. PATENT DOCUMENTS

| | | | |
|---|---|---|---|
| 10,162,946 B2* | 12/2018 | Yamamoto | H04L 63/10 |
| 2005/0041586 A1* | 2/2005 | Jiang | H04L 1/1832 |
| | | | 370/236 |
| 2006/0050679 A1* | 3/2006 | Jiang | H04L 7/041 |
| | | | 370/350 |
| 2007/0180526 A1* | 8/2007 | Copeland, III | H04L 63/1416 |
| | | | 726/23 |
| 2010/0268980 A1* | 10/2010 | Watanabe | H04J 3/0685 |
| | | | 714/2 |
| 2011/0208884 A1* | 8/2011 | Horihata | H04L 12/40143 |
| | | | 710/105 |
| 2014/0173068 A1* | 6/2014 | Monma | H04L 61/2007 |
| | | | 709/221 |
| 2014/0273826 A1* | 9/2014 | Want | H04B 5/0056 |
| | | | 455/41.1 |
| 2014/0328352 A1* | 11/2014 | Mabuchi | H04L 12/4035 |
| | | | 370/451 |
| 2015/0312279 A1* | 10/2015 | Wentink | H04W 74/0816 |
| | | | 370/329 |
| 2015/0350317 A1* | 12/2015 | Gvillo | H04L 67/1095 |
| | | | 709/248 |
| 2016/0205194 A1* | 7/2016 | Kishikawa | H04L 9/3242 |
| | | | 726/1 |

* cited by examiner

FIG. 6

Frame F11:

| SOF | arbitration | | CTRL | | | DATA | CRC | | ACK | | EOF |
|---|---|---|---|---|---|---|---|---|---|---|---|
| | ID | RTR | IDE | RES | DLC | | CRC SEQ | CRC DEL | ACK SLOT | ACK DEL | |
| 1 | 11 | 1 | 1 | 1 | 4 | 0–64 | 15 | 1 | 1 | 1 | 7 |

Frame F12:

| SOF | arbitration | | | | CTRL | | | DATA | CRC | | ACK | | EOF |
|---|---|---|---|---|---|---|---|---|---|---|---|---|---|
| | ID BASE | SRR | IDE | ID EXT | RTR | r1 | DLC | | CRC SEQ | CRC DEL | ACK SLOT | ACK DEL | |
| 1 | 11 | 1 | 1 | 18 | 1 | 1 | 4 | 0–64 | 15 | 1 | 1 | 1 | 7 |

| ID | CYCLE | POSITION OF SHORT INTERVAL FLAG |
|---|---|---|
| 0×123 | 100ms | LEADING BIT OF DATA FIELD |

61

| VALUE OF SHORT INTERVAL FLAG | CONDITION |
|---|---|
| 0 | TIME PERIOD FROM TRANSMISSION TIME OF LAST MESSAGE TO TRANSMISSION TIME OF CURRENT MESSAGE IS EQUAL TO CYCLE |
| 1 | TIME PERIOD FROM TRANSMISSION TIME OF LAST MESSAGE TO TRANSMISSION TIME OF CURRENT MESSAGE IS SHORTER THAN CYCLE |

62

F I G. 7

F I G. 15

Table 31:

| ID | CYCLE | MARGIN | POSITION OF SHORT INTERVAL FLAG |
|---|---|---|---|
| 0×123 | 100ms | 40ms | LEADING BIT OF DATA FIELD |
| ... | ... | ... | ... |

Table 76:

| ID | REFERENCE TIME |
|---|---|
| 0×123 | 50ms |
| ... | ... |

Table 77:

| RECEPTION ORDER FROM REFERENCE MESSAGE | RECEPTION RANGE |
|---|---|
| 1 | 110ms~190ms |
| 2 | 210ms~290ms |
| 3 | 310ms~390ms |
| ... | ... |

DEVICE AND METHOD FOR DETECTING ATTACK IN NETWORK

CROSS-REFERENCE TO RELATED APPLICATION

This application is based upon and claims the benefit of priority of the prior Japanese Patent Application No. 2016-230868, filed on Nov. 29, 2016, the entire contents of which are incorporated herein by reference.

FIELD

The embodiments discussed herein are related to a device, a method, and a program for detecting an attack in a network.

BACKGROUND

A network technology called a CAN (controller area network) may be used for performing transmission and reception of data or control information between devices that are used for an on-board network of a vehicle or for factory automation. A system in which the CAN is used includes a plurality of ECUs (electronic control units). The ECUs communicate with one another by performing transmission of a data frame (message). In the CAN, a data frame that is used for communication includes identification information (ID) used for identifying a data frame. Further, each of the ECUs has stored therein an ID of a data frame to be received. In the CAN, a data frame is broadcast, so a plurality of data frames arrive at the ECUs connected to the CAN at the same time. When the transmission timings of a plurality of data frames are the same as one another, the priority of a data frame is determined according to the value of an ID included in a data frame, and a data frame that has priority is transmitted earlier. A data frame that has low priority is broadcast after the data frame having high priority is transmitted. When data frames are broadcast, each of the ECUs receives a data frame that includes an ID that is set to be received by the ECU but discards a data frame that includes an ID that is not set to be received.

Due to this scheme, when an attack has been performed on a network using a data frame including an ID that has been set to be received by an ECU, the ECU will receive the frame used for the attack. The ECU which receives a frame used for an attack may take an action that the ECU would not take normally, due to the reception of the frame. Thus, attempts to identify a frame transmitted for an attack have been made. For example, a method for deciding whether a data frame has been transmitted for an attack has been proposed, the method including verifying, when a data frame is received that does not comply with a specified rule for a data frame transmission cycle, a specific identifier in the data frame (for example, International Publication Pamphlet No. WO 2015/170451).

However, it may be difficult to identify a frame used for an attack in a system in which both a data frame transmitted periodically and a data frame not transmitted periodically are transmitted. In the technology described above, when a certain message that is not transmitted in a specified transmission cycle is transmitted and a message is then periodically transmitted in the specified transmission cycle with the transmission time of the certain message used as a reference, the periodically transmitted message may be erroneously identified as a frame used for attack.

SUMMARY

According to an aspect of the embodiments, an attack detection device includes: a transceiver configured to receive a message from a communication device in a network; and a processor configured to calculate, according to a reception time of a first message in periodic messages that are periodically transmitted in a specified transmission cycle in the network, a reception range for a target message in the periodic messages that are received after the first message by the transceiver. When the transceiver receives a second message that is associated with information indicating that the second message is transmitted at a time interval shorter than the transmission cycle outside of the reception range after the reception time of the first message, the processor updates the reception range for a target message in the periodic messages that are received after the second message by the transceiver according to a reception time of the second message and the transmission cycle.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates examples of formats of frames;

FIG. 7 illustrates an example of information maintained by the transmission device;

FIG. 15 illustrates an example of information maintained by the attack detection device;

DESCRIPTION OF EMBODIMENTS

Figure 1:
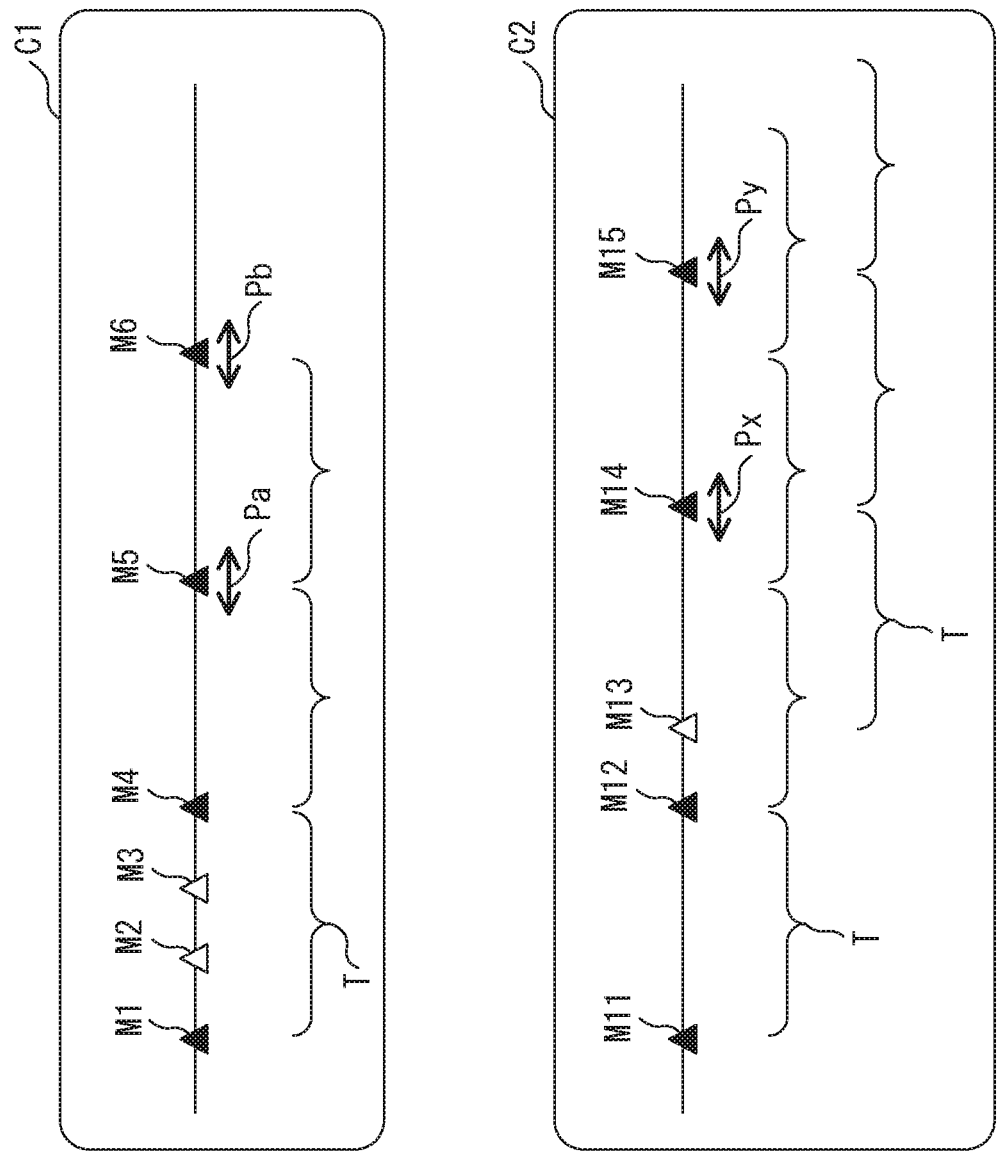
FIG. 1 illustrates an example of an attack detection method.

FIG. 1 illustrates an example of an attack detection method according to embodiments. In FIG. 1, a black triangle (▲) represents a timing at which an attack detection device receives a data frame (a periodic message) that is transmitted periodically, and a white triangle (△) represents a timing at which the attack detection device receives a data frame (an aperiodic message) that is transmitted independently of the transmission cycle. In a case C1, aperiodic messages M2 and M3 are transmitted between periodic messages M1 and M4, and after that, periodic messages M5 and M6 are transmitted. In this case, the transmission time of the message M1 remains a reference for a transmission cycle. On the other hand, in a case C2, an aperiodic message M13 is transmitted after periodic messages M11 and M12, and after that, periodic messages M14 and M15 are transmitted with the transmission time of the message M13 used as a reference for a transmission cycle.

In the method according to the embodiments, a communication device (a transmission device) that transmits a data frame performs processing that causes the attack detection device to know whether a message to be transmitted has been transmitted when a time period that is shorter than a transmission cycle has elapsed since the transmission time of the most recent previous message. This processing is performed independently of whether a message is transmitted periodically or aperiodically. For example, the transmission device can include, in a frame to be transmitted, a flag (a short interval flag) that is used to decide whether the transmission frame is a message that is transmitted at a time interval shorter than a transmission cycle. In FIG. 1, it is assumed that "short interval flag=1" is set in a message transmitted at a time interval shorter than a transmission cycle and "short interval flag=0" is set in a message transmitted in the transmission cycle.

For example, in the case C2, when a transmission cycle is T, the transmission device transmits the message M13 before the transmission cycle has elapsed since the transmission time of the message M12. Thus, the transmission device sets the short interval flag to 1 in the message M13. On the other hand, the transmission device transmits the message M14 when the transmission cycle has elapsed since the transmission time of the message M13, and transmits the message M15 when the transmission cycle has elapsed since the transmission time of the message M14. Thus, the short interval flag is set to 0 in the messages M14 and M15. Likewise, the short interval flag is also set to 0 in the message M12.

When a received message is a message transmitted before a transmission cycle has elapsed since the transmission time of the most recent previous message, the attack detection device predicts a reception time of a next message when the next message is transmitted periodically with the received message used as a reference. On the other hand, when the received message is a message transmitted when the transmission cycle has elapsed since the transmission time of the most recent previous message, the attack detection device decides that a next message is not a frame used for attack when the reception time of the next message is included in the predicted reception range.

For example, the attack detection device receives the message M13 after the message M12 is received. "Short interval flag=1" is set in the message M13, so the attack detection device calculates, as a reception range for a message that is received next after the reception of the message M13, a time period that includes a time at which a time interval T of transmitting a message has elapsed since the reception time of the message M13. Here, the reception range for the message that is received next after the reception of the message M13 is indicated by an arrow Px.

The attack detection device receives the message M14 in which "short interval flag=0" is set after the message M13. In the example of the case C2, the reception time of the message M14 is included in a reception range predicted for the message M14 (arrow Px). Thus, the attack detection device decides that the message M14 is not a frame for attack. Then, the attack detection device calculates a reception range for a message that is received next after the reception of the message M14, using the reception time of the message M14 and the transmission cycle T. Here, the reception range for the message that is received next after the reception of the message M14 is indicated by an arrow Py. The attack detection device receives the message M15 in which "short interval flag=0" is set in a predicted reception range (the arrow Py). Thus, the attack detection device decides that the message M15 is not a frame for attack.

As described above, in the method according to the embodiments, the attack detection device can decide whether a received message is a message transmitted from the transmission device at a time interval shorter than a transmission cycle, using, for example, a short interval flag. Thus, it is possible to decide whether a periodic message is a frame for attack even when the periodical message is transmitted, with an aperiodic message used as a reference, after the transmission of the aperiodic message, as in the case C2. It is often the case that, in a system related to, for example, a CAN provided in a vehicle, a periodic message is transmitted with an aperiodic message used as a reference, as in the case C2, so the method according to the embodiments can be easily applied to, for example, a CAN provided in a vehicle.

The method according to the embodiments makes it possible to decide whether a periodic message is a frame for attack not only in the case C2 but also in the case C1 in which an aperiodic message is transmitted between transmissions of periodic messages.

For example, in the case C1, when a transmission cycle is T, the transmission device transmits the messages M2, M3, M4 before the transmission cycle has elapsed since the transmission time of the most recent previous message. Thus, the transmission device sets the short interval flag to 1 in the messages M2, M3, and M4. On the other hand, the transmission device transmits the message M5 when the transmission cycle has elapsed since the transmission time of the message M4, and transmits the message M6 when the transmission cycle has elapsed since the transmission time of the message M5. Thus, the short interval flag is set to 0 in the messages M5 and M6.

The attack detection device receives the message M2 after the message M1 is received. "Short interval flag=1" is set in the message M2, so the attack detection device calculates a reception range for a message that is received next after the reception of the message M2, using the reception time of the message M2 and a time interval T of transmitting a message. The attack detection device receives the message M3 next after the reception of the message M2, and calculates a reception range for a message that is received next after the reception of the message M3 because "short interval flag=1" is also set in the message M3. The attack detection device receives the message M4 next after the reception of the message M3, and calculates a reception range for a message that is received next after the reception of the message M4 because "short interval flag=1" is also set in the message M4. Here, the reception range for the message that is received next after the reception of the message M4 is indicated by an arrow Pa.

Next, after the reception of the message M4, the attack detection device receives the message M5 in which "short interval flag=0" is set. In the example of the case C1, the reception time of the message M5 is included in the reception range (arrow Pa) predicted for the message M5, so the attack detection device decides that the message M5 is not a frame for attack. Then, the attack detection device calculates a reception range for a message that is received next after the reception of the message M5, using the reception time of the message M5 and the transmission cycle T. The reception range for the message that is received next after the reception of the message M5 is indicated by an arrow Pb. It is assumed that, in the predicted reception range (arrow Pb), the attack detection device receives the message M6 in which "short interval flag=0" is set next after the reception of the message M5. In this case, the attack detection device decides that the message M6 is not a frame for attack.

As described above, the method according to the embodiments can be applied to both a system in which a time that is used as a reference for a transmission cycle for a periodic message is changed according to a transmission time of an aperiodic message and a system in which a time that is used as a reference for a transmission cycle for a periodic message is not changed according to an aperiodic message. This results in improving an accuracy in attack detection performed in a system in which both a data frame transmitted periodically and a data frame not transmitted periodically are transmitted. In particular, the method according to the embodiments permits an improvement in an accuracy in detecting an attack that spoofs a periodic message.

Example of Device Configuration and Network

Figure 2:
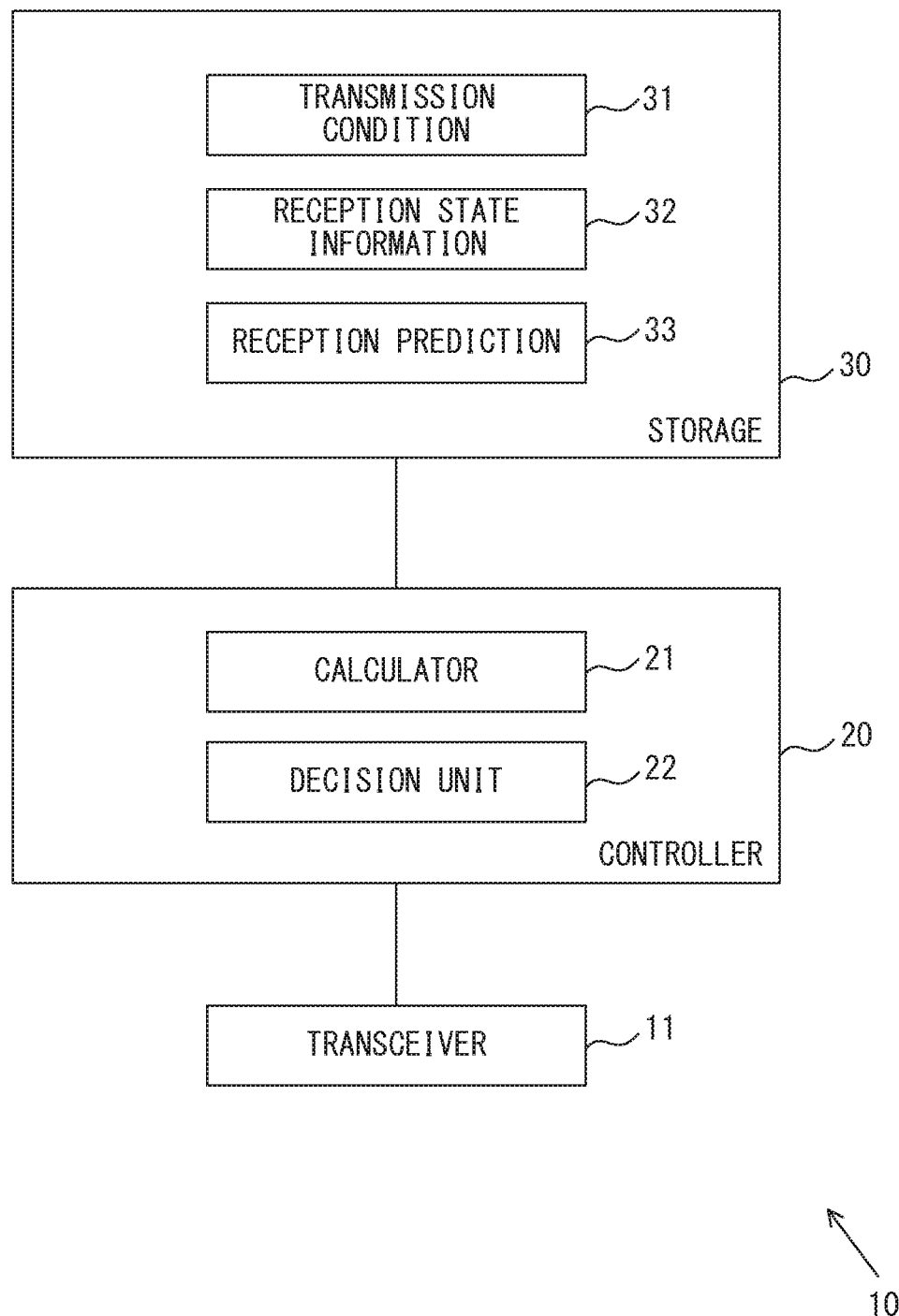
FIG. 2 illustrates an example of an attack detection device.

FIG. 2 illustrates an example of a configuration of an attack detection device 10. The attack detection device 10 includes a transceiver 11, a controller 20, and a storage 30. The controller 20 includes a calculator 21 and a decision unit 22. The storage 30 maintains a transmission condition 31, reception state information 32, and a reception prediction 33.

An ID included in a periodic message that is received by the attack detection device 10 is associated with a transmission cycle for the periodic message identified by the ID in the transmission condition 31. A reception time of the latest message received by the attack detection device 10 is recorded in the reception state information 32. Examples of the transmission condition 31 and the reception state information 32 will be described later.

The calculator 21 calculates a reception prediction for a periodic message for each ID using the transmission condition 31 and the reception state information 32. The calculator 21 stores an obtained calculation result as the reception prediction 33. Thus, the reception prediction 33 is also generated for each ID. An example of the reception prediction 33 will also be described later. Using a short interval flag in a received message and the reception prediction 33, the decision unit 22 decides whether an attack against a network has occurred.

Figure 3:
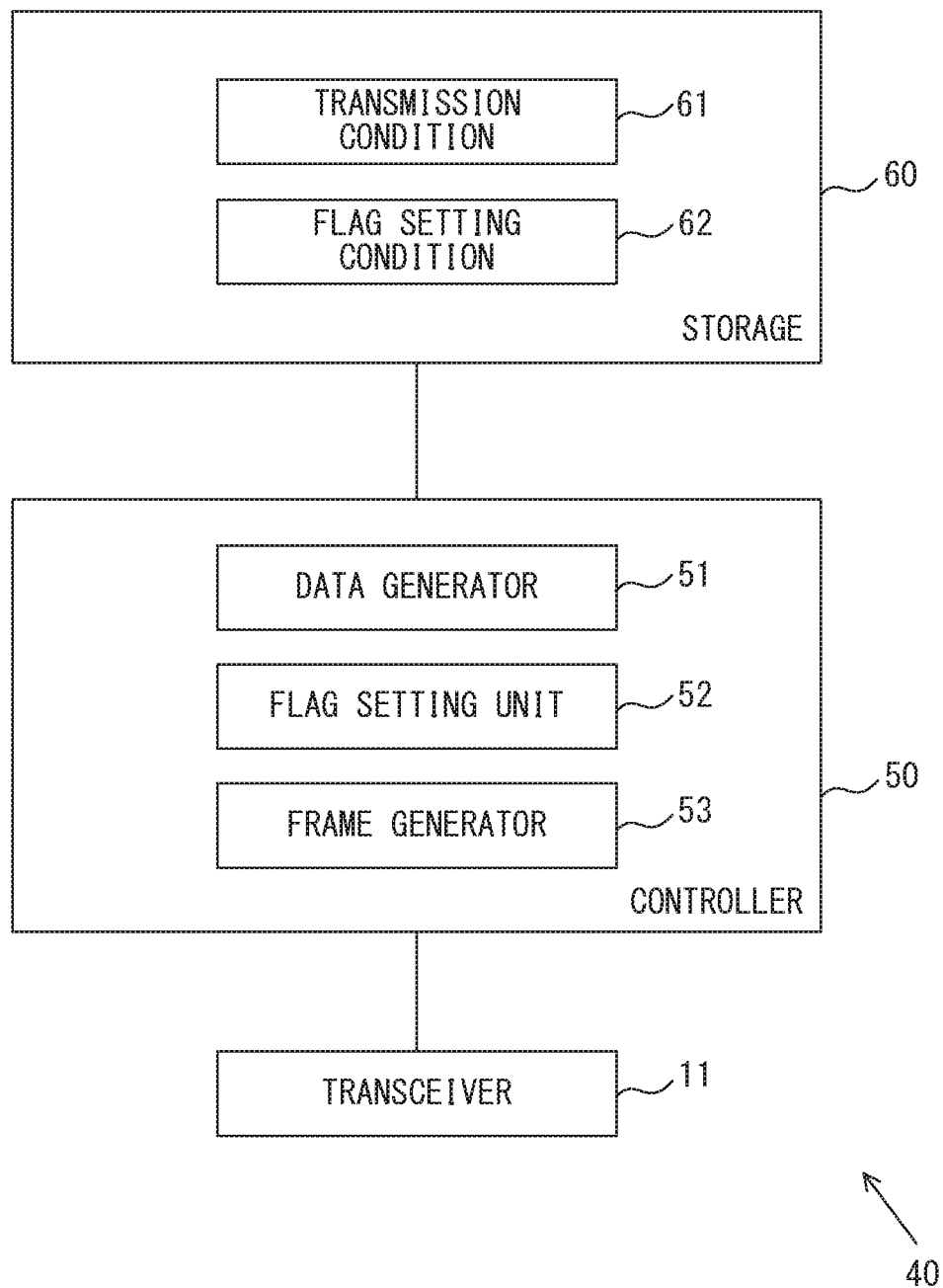
FIG. 3 illustrates an example of a transmission device.

FIG. 3 illustrates an example of a configuration of a transmission device 40. The transmission device 40 includes the transceiver 11, a controller 50, and a storage 60. The controller 50 includes a data generator 51, a flag setting unit 52, and a frame generator 53. The storage 60 maintains a transmission condition 61 and a flag setting condition 62.

An ID included in a periodic message that is transmitted by the transmission device 40 is associated with a transmission cycle for the periodic message identified by the ID in the transmission condition 61. The flag setting condition 62 indicates a setting condition for a short interval flag. Here, the short interval flag indicates whether a time period from the transmission time of a previous frame that has the same identification information as a target frame to the transmission time of the target frame is shorter than the transmission cycle.

The data generator 51 generates data that is included in a transmission frame. The flag setting unit 52 sets a short interval flag according to the flag setting condition 62. The frame generator 53 generates a frame to be transmitted, using the data generated by the data generator 51 and a result of setting a short interval flag by the flag setting unit 52. The transceiver 11 transmits/receives a frame to/from the other devices.

Figure 4:
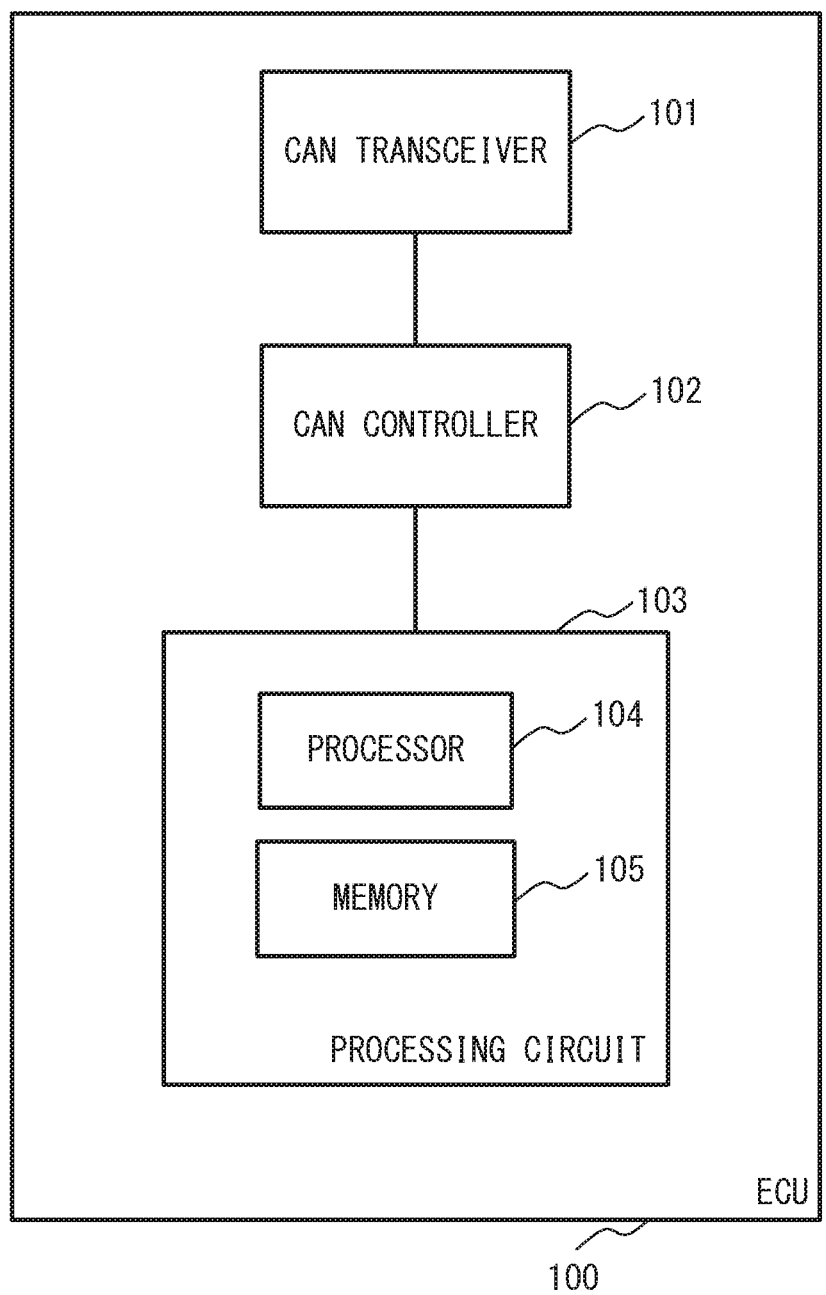
FIG. 4 illustrates an example of a hardware configuration.

FIG. 4 illustrates an example of a hardware configuration of the attack detection device 10 and the transmission device 40. In the example of FIG. 4, the attack detection device 10 and the transmission device 40 are respectively implemented by as an ECU 100. The ECU 100 includes a CAN transceiver 101, a CAN controller 102, and a processing circuit 103. The processing circuit 103 includes a processor 104 and a memory 105.

The CAN transceiver 101 performs processing such as an adjustment of a bus voltage as needed, in order for the ECU 100 to communicate with the other devices in a CAN. The CAN controller 102 performs processing such as a CRC (cyclic redundancy check) and bit stuffing for a received frame so as to extract data. The CAN controller 102 outputs the extracted data to the processor 104. The processor 104 may be any processing circuit, and may be, for example, a CPU (central processing unit). The processor reads a program stored in the memory 105 and performs processing. The ECU 100 may include a device that reads a program or data from a storage medium. In this case, the program may be recorded in any storage medium, and is read by the ECU 100 from the storage medium as needed.

In the attack detection device 10, the transceiver 11 is implemented by the CAN transceiver 101 and the CAN controller 102. The processor 104 operates as the controller 20. The memory 105 works as the storage 30. In the transmission device 40, the transceiver 11 is implemented by the CAN transceiver 101 and the CAN controller 102. The processor 104 operates as the controller 50. The memory 105 works as the storage 60.

Examples of Network and Frame

Figure 5:
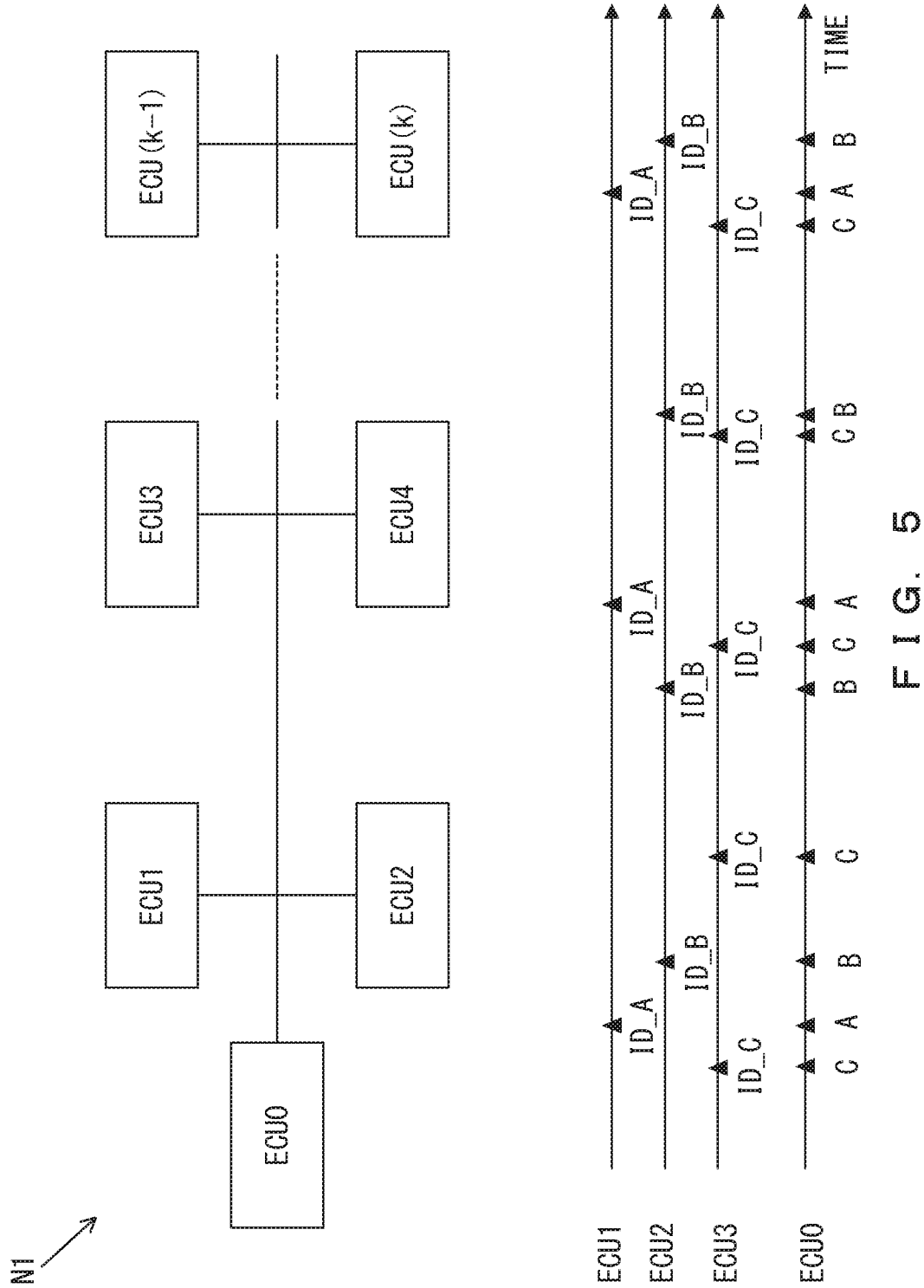
FIG. 5 illustrates examples of a configuration and an operation of a network.

FIG. 5 illustrates an example of a network. In a network N1 illustrated in FIG. 5, a plurality of ECUs 100 (ECU 0 to ECU k) are connected to one another through a bus such that a frame can be transmitted and received between the ECUs 100. It is assumed that one or more ECUs 100 included in the network of FIG. 5 operate as the attack detection device 10. For example, one attack detection device 10 may detect attacks against all of the periodic messages that are transmitted in the network. Alternatively, a detection target may be assigned for corresponding attack detection device 10 such that attacks against all of the periodic messages are detected using a plurality of attack detection devices 10. One or more ECUs 100 included in the network of FIG. 5 operate as the transmission device 40.

FIG. 5 also illustrates examples of a transmission timing of a periodic message and a reception timing of the periodic message at the attack detection device 10. In the example of FIG. 5, it is assumed that the ECU 0 operates as the attack detection device 10 so as to detect attacks with respect to periodic messages in which ID=A, ID=B, and ID=C, respectively. In this case, the ECU 0 that operates as the attack detection device 10 receives the periodic messages in which ID=A, ID=B, and ID=C, respectively, as a detection target.

Note that, it is assumed that the ECU 1 transmits the periodic message in which ID=A and the ECU 2 transmits the periodic message in which ID=B. Further, it is assumed that the ECU 3 transmits the periodic message in which ID=C. As illustrated in the timing chart of FIG. 5, each of the periodic messages in which ID=A, ID=B, and ID=C, respectively, is received by the ECU 0 at almost the same timing as its transmission timing. The ECU 0 analyzes a reception timing of a received message with respect to an ID included in the received message so as to detect an attack. The detection of an attack will be described in detail later.

FIG. 6 illustrates examples of formats of data-frames. F11 of FIG. 6 is an example of a format of a data-frame of a standard configuration, and F12 is an example of a format of a data-frame of an extended configuration.

The frame of a standard configuration includes an SOF (start of frame), an arbitration field, a control field, a data field, a CRC field, an ACK field, and an EOF (end of frame). The arbitration field includes an ID and an RTR (remote transmission request). Here, the ID is identification information used to identify a data frame. The control field includes an IDE (identifier extension), a reservation bit, and a DLC (data length code). The CRC field includes a CRC sequence and a CRC delimiter. The ACK field includes an ACK slot and an ACK delimiter. The bit length of an information element included in each field is as given in the last line of F11. For example, the length of the ID is 11 bits, and the length of the data field is a variable length between 0 and 64 bits.

The data frame of an extended configuration (F12) also includes an SOF, an arbitration field, a control field, a data field, a CRC field, an ACK field, and an EOF. The arbitration field in the extended configuration includes an ID base, an SRR (substitute remote request bit), an IDE, an ID extension, and an RTR. In the extended configuration, identification information (ID) on a data frame is represented by a bit string obtained by placing a bit string stored as an ID extension after a bit string stored as an ID base. From the control field to the EOF, the format of an extended configuration has a configuration similar to that of the format of a standard configuration. Further, the bit length of an information element included in each field is as given in the last line of F12. Thus, in the extended format, a bit string of 29 bits obtained by combining 11 bits of the ID base and 18 bits of the ID extension is used as identification information on a transmission source.

A short interval flag is included in the data field if the format of a frame transmitted in a system is F11 or F12. Further, it is assumed that the transmission device 40 and the attack detection device 10 have each stored therein information indicating a region in which a short interval flag is recorded in the data field. For example, the setting position of a short interval flag may be included in, for example, the transmission condition 31, and the transmission condition 61 or the flag setting condition 62.

An example of processing performed in each embodiment is described below, using the case in which a data frame that uses the format of F11 in FIG. 6 is transmitted. Processing is performed similarly when a data frame used to perform communication is a data frame of an extended configuration.

First Embodiment

A first embodiment will now be described, divided into a transmission of a frame from the transmission device 40 and decision processing performed in the attack detection device 10.

(1) Transmission of Frame from Transmission Device 40

FIG. 7 illustrates an example of information maintained by the transmission device 40. The transmission condition 61 includes an ID included in a message transmitted by the transmission device 40, a transmission cycle, and a position of a short interval flag. The transmission cycle is a specified cycle in which a periodic message identified by an ID in corresponding entry is transmitted. The position of a short interval flag is information that specifies a region in the data field that is used for a short interval flag of a message identified by the ID in corresponding entry. For example, the transmission condition 61 of FIG. 7 includes information indicating that a periodic message in which ID=0x123 is transmitted in a 100-ms cycle and information indicating that, in the message in which ID=0x123, a leading bit of the data field is used for a short interval flag.

In the flag setting condition 62, a value of a short interval flag is associated with a condition when the value is set. In the example of FIG. 7, with respect to a message identified by a certain ID, when a time period from the transmission time of the last message to the transmission time of a current message is equal to the transmission cycle, information indicating that "short interval flag=0" is set is recorded in the flag setting condition 62. On the other hand, with respect to the message identified by the certain ID, when the time period from the transmission time of the last message to the transmission time of the current message is shorter than the transmission cycle, "short interval flag=1" is set. For example, the flag setting unit 52 includes a timer to measure a time interval of transmitting a frame for each ID of a frame on which transmission processing is performed, and can determine a setting value of a short interval flag using a count value of the timer.

Figure 8:
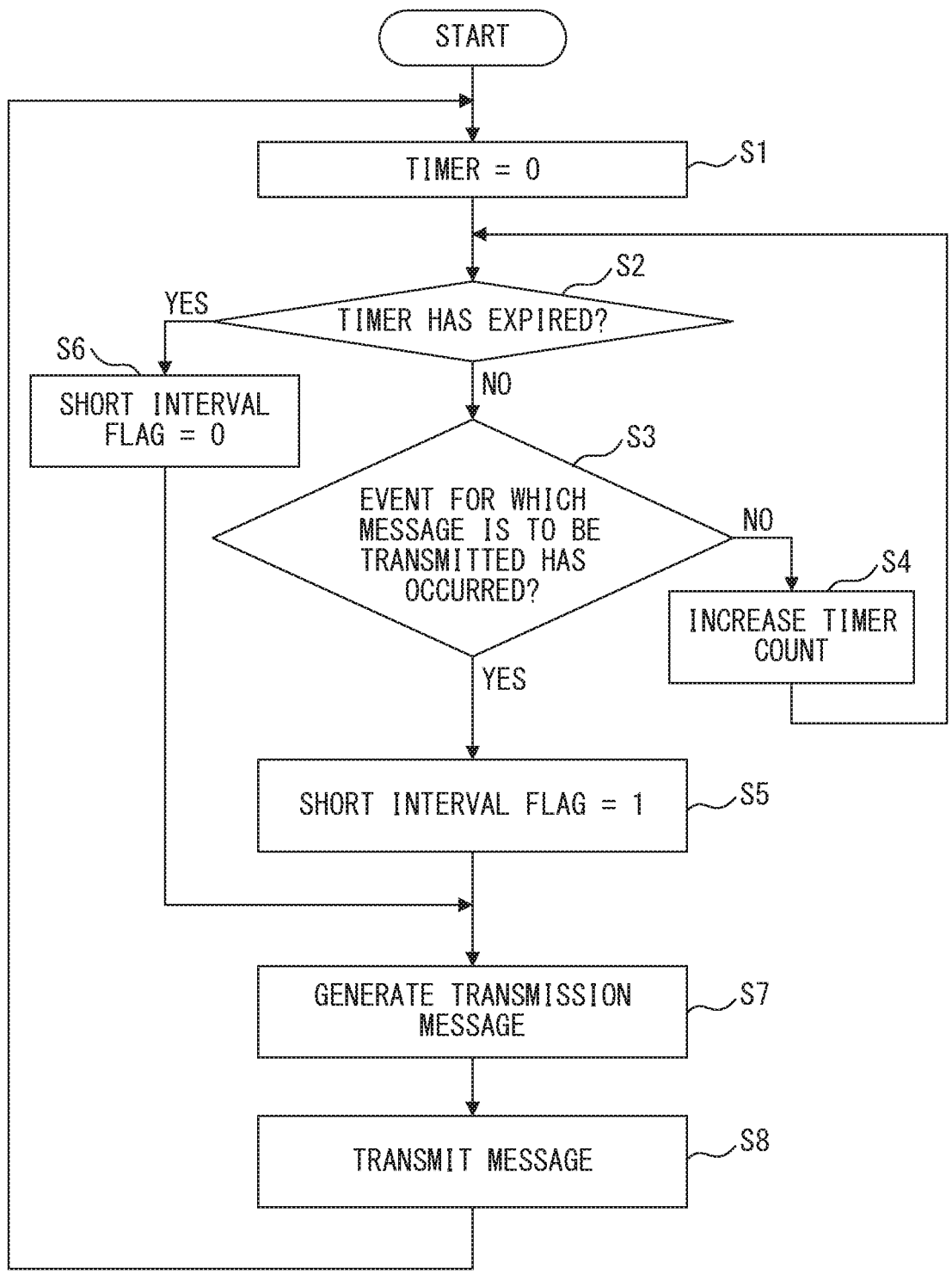
FIG. 8 is a flowchart that illustrates an example of transmission processing.

FIG. 8 is a flowchart that illustrates an example of transmission processing. In the example of FIG. 8, it is assumed that the timer is set to expire in a transmission cycle associated with an ID that is included in a message (a data frame) for which a transmission interval is measured by the timer. For example, when the transmission device 40 has the transmission condition 61 illustrated in FIG. 7, the timer used to process the message in which ID=0x123 is set to expire in 100 ms.

The flag setting unit 52 initializes the timer (Step S1). After that, the flag setting unit 52 decides whether the timer has expired (Step S2). When the timer has not expired, the flag setting unit 52 decides whether an event for which a message is to be transmitted has occurred (No in Step S2, Step S3). When the event for which a message is to be transmitted has not occurred, the flag setting unit 52 increases the timer count and the process returns to Step S2 (No in Step S3, Step S4).

On the other hand, when the event for which a message is to be transmitted has occurred, processing of transmitting an aperiodic message is performed (Yes in Step S3). The flag setting unit 52 sets the short interval flag to 1 (Step S5). The flag setting unit 52 reports the value of the short interval flag to the frame generator 53. The frame generator 53 generates a transmission message using data generated by the data generator 51, the value of the short interval flag determined by the flag setting unit 52, and information on a position of the short interval flag (Step S7). The transceiver 11 transmits the generated message and the process returns to Step S1 (Step S8).

When the timer has expired in Step S2, processing of transmitting a periodic message is performed (Yes in Step S2). The flag setting unit 52 sets the short interval flag to 0 (Step S6). After that, the flag setting unit 52 reports the value of the short interval flag to the frame generator 53. Thus, the processes of Steps S7 and S8 are also performed after the process of Step S6.

FIG. 8 is merely an example of processing performed in the transmission device 40, and modifications may be made thereto depending on implementation. For example, as illustrated in the case C1 of FIG. 1, in a system in which an aperiodic message is transmitted without changing a reference for a periodic message, the processing performed in the transmission device 40 is modified such that the process returns to Step S2 after the process of Step S8.

(2) Decision Processing Performed in Attack Detection Device 10

Figure 9:
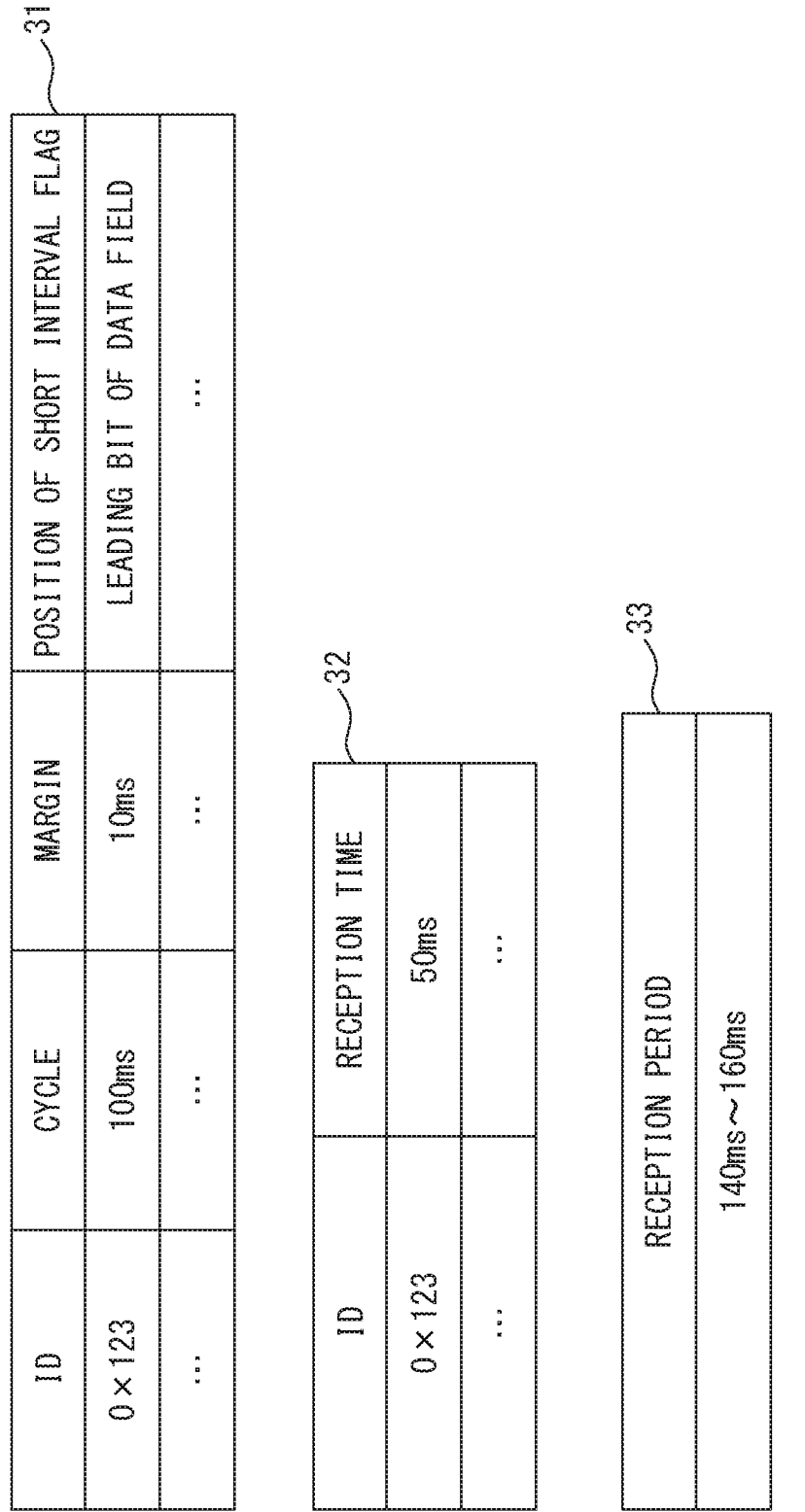
FIG. 9 illustrates an example of information maintained by the attack detection device.

FIG. 9 illustrates an example of information maintained by the attack detection device 10. The attack detection device 10 has stored therein the transmission condition 31. The transmission condition 31 includes an ID that is included in a message received by the attack detection device 10, a transmission cycle, a margin, and a position of a short interval flag. The transmission cycle is a specified cycle in which a periodic message identified by an ID in corresponding entry is transmitted. The margin is a value that is used, upon predicting a reception range for the periodic message identified by the ID in corresponding entry, as an acceptable value that indicates the extent to which the reception range can be out of range of the transmission cycle. The position of a short interval flag is information that specifies a region in the data field that is used for a short interval flag in a message identified by the ID in corresponding entry.

The transmission condition 31 of FIG. 9 includes information indicating that a periodic message in which ID=0x123 is transmitted in a 100-ms cycle and information indicating that a 10-ms margin is used for a prediction of a reception range for the periodic message in which ID=0x123. The transmission condition 31 further includes information indicating that, in the message in which ID=0x123, a leading bit of the data field is used as a short interval flag.

A reception time of a message that can be used to calculate a reception range and an ID included in the message are associated with each other and recorded in the reception state information 32. Here, a periodic message that has been decided to not be used for an attack and a message transmitted at a time interval shorter than the transmission cycle may be used as the message that can be used to calculate a reception range. The decision unit 22 records, in the reception state information 32, a reception time of a target message in the messages that can be used to calculate a reception range. Note that, the target message is a message that was received most recently among the messages that can be used to calculate a reception range. FIG. 9 illustrates an example of the reception state information 32. In the example of FIG. 9, the time at which the attack detection device 10 receives the message in which ID=0x123 (as a message that can be used to calculate a reception range) is 50 ms. The decision processing performed in the decision unit 22 is described with reference to FIG. 10.

When the reception state information 32 has been updated, the calculator 21 generates the reception prediction 33 for each ID using the transmission cycle and the margin that are recorded in the transmission condition 31. FIG. 9 illustrates an example of the reception prediction 33 generated for the periodic message in which ID=0x123. The message that can be used to calculate a reception range is received at 50 ms, so a time period (that is, the reception range) in which a message transmitted in the transmission cycle T can be received is calculated by "50 ms+100 ms±10 ms". Thus, when the message in which ID=0x123 and "short interval flag=0" is set is received next, the received message is predicted to be received in the reception range, that is, between 140 ms and 160 ms if the received message is not a frame for attack.

Figure 10:
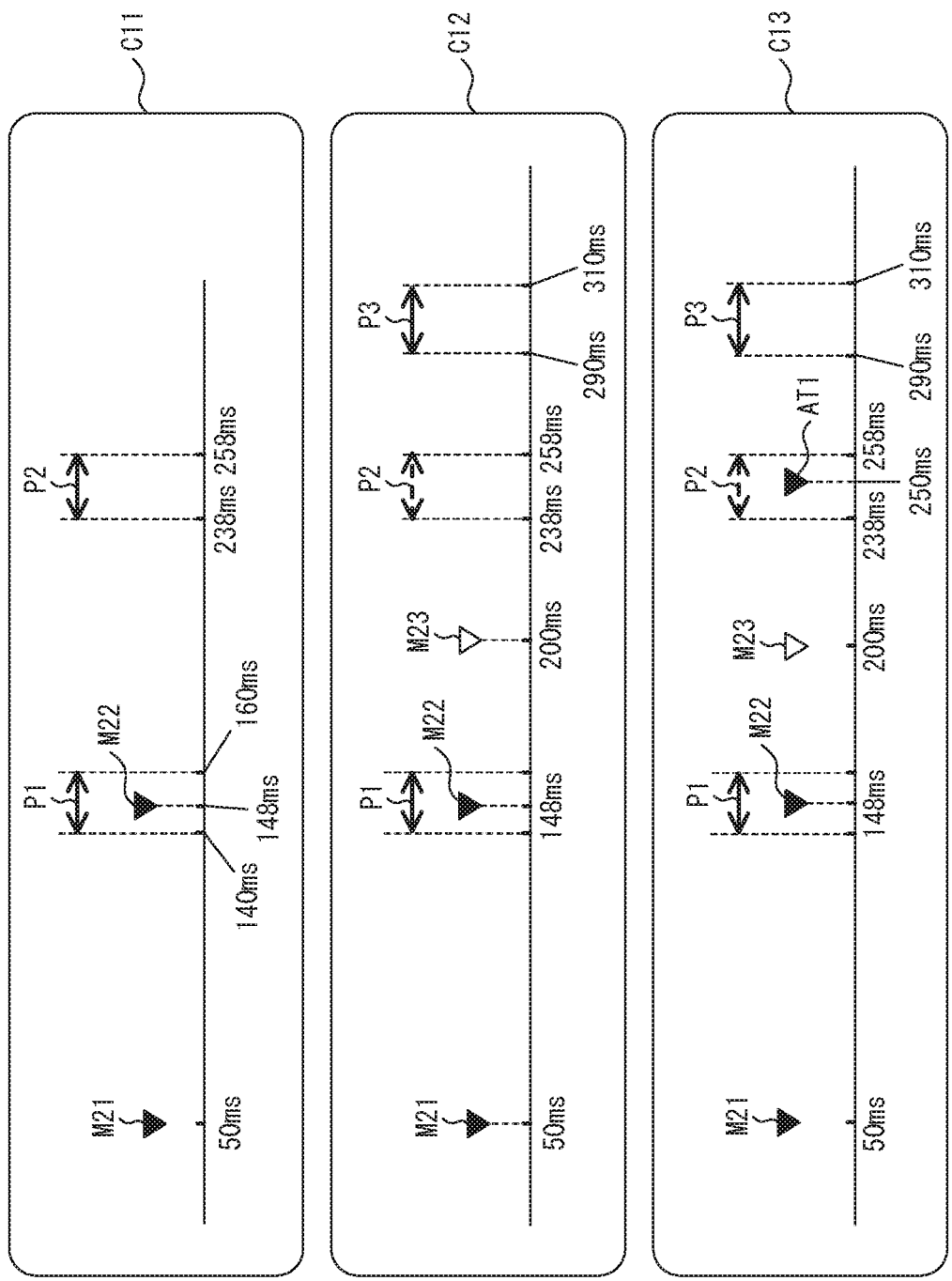
FIG. 10 illustrates an example of an attack detection method according to a first embodiment.

FIG. 10 illustrates an example of an attack detection method according to the first embodiment. In FIG. 10, a black triangle (▼) represents a timing at which the attack detection device 10 receives a message in which "short interval flag=0" is set, and a white triangle (▽) represents a timing at which the attack detection device 10 receives a message in which "short interval flag=1" is set. In FIG. 10, it is assumed that messages M21 to M23 and a frame AT1 that is used for an attack are all identified by ID=0x123.

It is assumed that, at 0 ms in a case C11, the attack detection device 10 has not received any messages that can be used to calculate a reception range. In this case, data is not recorded in the reception state information 32 or the reception prediction 33.

It is assumed that, after that, the message M21 including ID=0x123 arrives at the attack detection device 10 at 50 ms. At this point, the reception prediction 33 is not prepared, so the decision unit 22 decides that the message M21 is not a frame for attack. The decision unit 22 records the reception time of the message M21 in the reception state information 32 (of FIG. 9).

When the reception state information 32 has been updated, the calculator 21 calculates a time period (reception range) in which a message transmitted in the transmission cycle T can be received using the transmission cycle and the margin that are recorded in the transmission condition 31 (FIG. 9). The message transmitted in the transmission period T includes "short time period flag=0". The calculator 21 performs calculation to obtain "between 140 ms and 160 ms" as a reception range of the message that includes "short time period flag=0", by performing the processing described with reference to FIG. 9. The reception range calculated by the calculator 21 for a message that is received next after the message M21 is indicated by an arrow P1.

It is assumed that the message M22 identified by ID=0x123 arrives at the attack detection device 10 at 148 ms. The decision unit 22 decides whether the reception time of the message M22 conforms to information in the reception prediction 33. As indicated by the arrow P1, the reception prediction 33 is "between 140 ms and 160 ms", so the reception time of the message M22 conforms to the information in the reception prediction 33. Thus, the decision unit 22 decides that the message M22 is not a frame for attack. The decision unit 22 updates the reception state information 32 using the reception time of the message M22.

When the reception state information 32 has been updated, the calculator 21 calculates a reception range for a message that is received next when the message includes "short time period flag=0", using the transmission cycle and the margin. It is assumed that the calculator 21 calculates "148 ms+100 ms±10 ms=between 238 ms and 258 ms" to obtain a reception range for the message that includes "short time period flag=0" because the reception time of the message M22 is 148 ms. The reception range calculated by the calculator 21 for the message that is received next after the reception of the message M22 is indicated by an arrow P2. The calculator 21 updates the reception prediction 33 using an obtained result of the calculation.

In the case C12, the message M23 arrives at the attack detection device 10 after the case C11. It is assumed that the message M23 identified by ID=0x123 arrives at the attack detection device 10 at 200 ms. The decision unit 22 decides whether the reception time of the message M23 conforms to information in the reception prediction 33. As indicated by the arrow P2, the reception prediction 33 is "between 238 ms and 258 ms", so the reception time of the message M23 does not conform to the information in the reception prediction 33.

Then, the decision unit 22 detects a value of a short interval flag included in the message M23. Here, the decision unit 22 uses information in the transmission condition 31 that indicates the position of a short interval flag. In this example, the short interval flag is set in a leading bit of the data field of the message M23. Here, it is assumed that the value of the leading bit of the data field of the message M23 is 1. In this case, the value of the short interval flag is 1, so the message M23 is transmitted before 100 ms, which is the transmission cycle, has elapsed since the transmission of the message M22. Thus, the decision unit 22 decides that the message M23 is not a frame used for attack. The decision unit 22 updates the reception state information 32 using the reception time of the message M23. In other words, the decision unit 22 knows from the reception of the message M23 that a message in which "short interval flag"=0 is not received in a time period indicated by a dashed arrow P2.

When the reception state information 32 has been updated, the calculator 21 calculates a reception range for a message that is received next when the message includes "short time period flag=0", using the transmission cycle and the margin. It is assumed that the calculator 21 calculates "200 ms+100 ms±10 ms=between 290 ms and 310 ms" to obtain a reception range for the message that includes "short interval flag=0" because the reception time of the message M23 is 200 ms. The reception range calculated by the calculator 21 for the message that is received next after the message M23 is indicated by an arrow P3. The calculator 21 updates the reception prediction 33 using an obtained result of the calculation.

In the case C13, the frame AT1 arrives at the attack detection device 10 after the case C12. It is assumed that the frame AT1 identified by ID=0x123 arrives at the attack detection device 10 at 250 ms. The decision unit 22 decides whether the reception time of the frame AT1 conforms to information in the reception prediction 33. As indicated by the arrow P3, the reception prediction 33 is "between 290 ms and 310 ms", so the reception time of the frame AT1 does not conform to the information in the reception prediction 33.

Then, the decision unit 22 detects a value of a short interval flag included in the frame AT1. It is assumed that the value of a leading bit of the data field of the frame AT1 is 0. In this case, the value of the short interval flag is 0, so it is understood that the frame AT1 was transmitted when 100 ms, which is the transmission cycle T, has elapsed since the transmission of the message M23, but the reception time of the frame AT1 does not conform to the reception prediction 33. Thus, the decision unit 22 decides that the frame AT1 is a frame used for attack.

Figure 11:
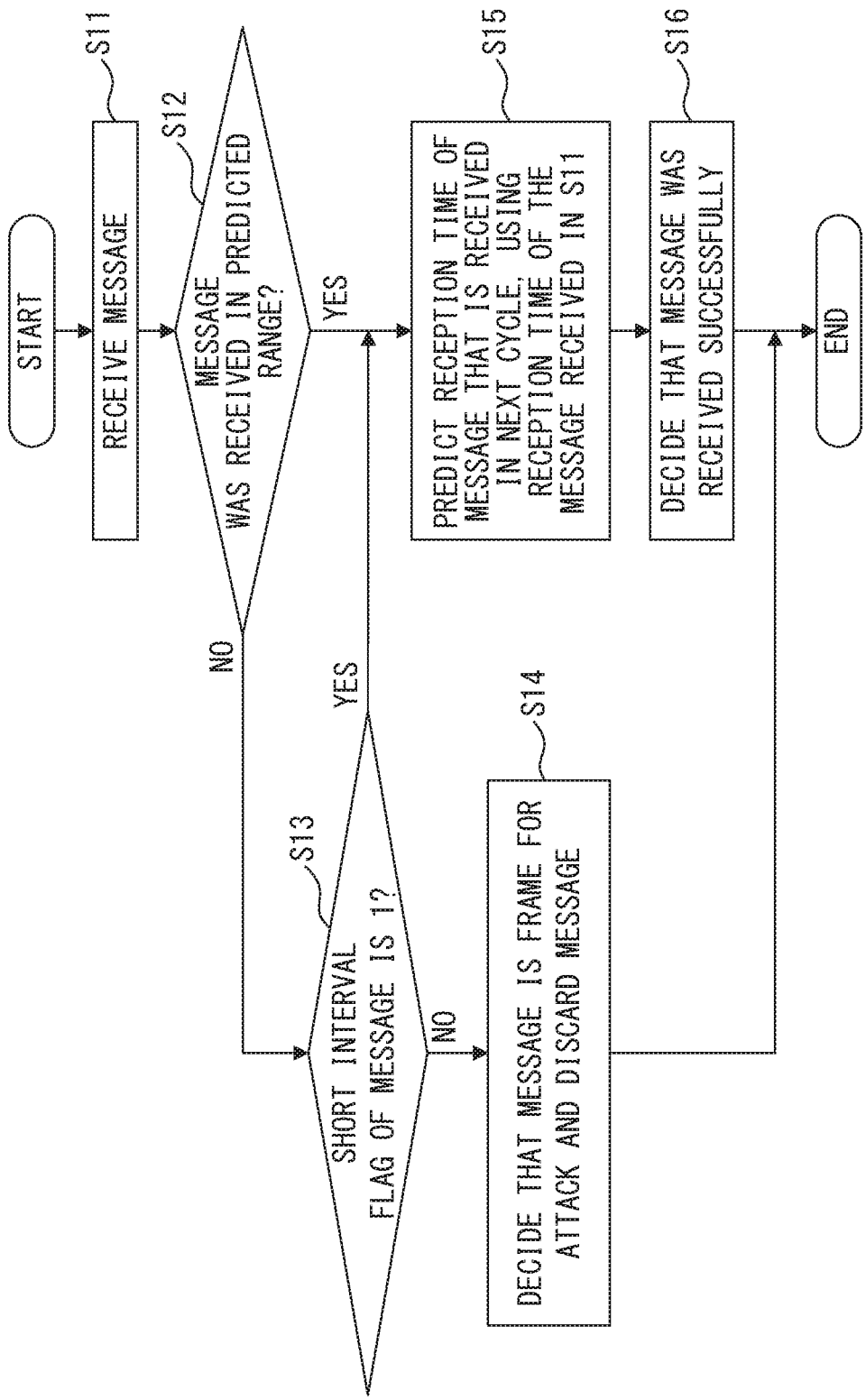
FIG. 11 is a flowchart that illustrates an example of processing performed in the attack detection device.

FIG. 11 is a flowchart that illustrates an example of processing performed in the attack detection device. FIG. 11 is merely an example, and the order of the processes may be changed depending on implementation. For example, Step S16 may be performed before Step S15.

The transceiver 11 receives a message (Step S11). Using the reception time of the message, the decision unit 22 decides whether the message was received in a time period predicted as the reception prediction 33 (Step S12). When the message was not received in the time period predicted as the reception prediction 33, the decision unit 22 decides whether the value of a short interval flag of the message is set to 1 (No in Step S12, Step S13). When the value of the short interval flag of the message is not set to 1, the decision unit 22 decides that the message is a frame for attack and discards the message (No in Step S13, Step S14).

On the other hand, when the value of the short interval flag of the message is set to 1, the calculator 21 predicts a reception time of a message that is received in a next cycle, using the reception time of the message received in Step S11 (Yes in Step S13, Step S15). In this case, the decision unit 22 decides that the message was received successfully (Step S16). The processes of Steps S15 and S16 are also performed when it has been decided in Step S12 that the message was received in the time period predicted as the reception prediction 33.

FIG. 11 is merely an example of processing performed in the attack detection device 10, and modifications may be made to the processing depending on implementation. For example, the decision unit 22 may be configured to decide whether the value of a short interval flag of a received message is set to 0 when it detects that the message was received in a time period predicted as the reception prediction 33 (Yes in Step S12).

As described above, in the method according to the first embodiment, the attack detection device 10 can decide, using a short interval flag, whether a received message is a message transmitted from the transmission device at a time interval shorter than a transmission cycle. The attack detection device 10 predicts a reception time of a message received in a next cycle, using a message received in a time period predicted as the reception prediction 33, or a message that has been confirmed, with a short interval flag, to be a message transmitted at a time interval shorter than the transmission cycle. Thus, the method according to the first embodiment can be applied to both a system in which a time that is used as a reference for a transmission cycle for a periodic message is changed according to a transmission time of an aperiodic message and a system in which a time that is used as a reference for a transmission cycle for a periodic message is not changed according to an aperiodic message. This results in improving an accuracy in attack detection performed in a system in which both a message transmitted periodically and a message not transmitted periodically are used.

Second Embodiment

In a second embodiment, processing is described that is performed when a margin is set to be wider in order to prevent an erroneous detection from occurring when a transmission timing of a periodic message is changed due to, for example, transmission timings of frames overlapping.

Figure 12:
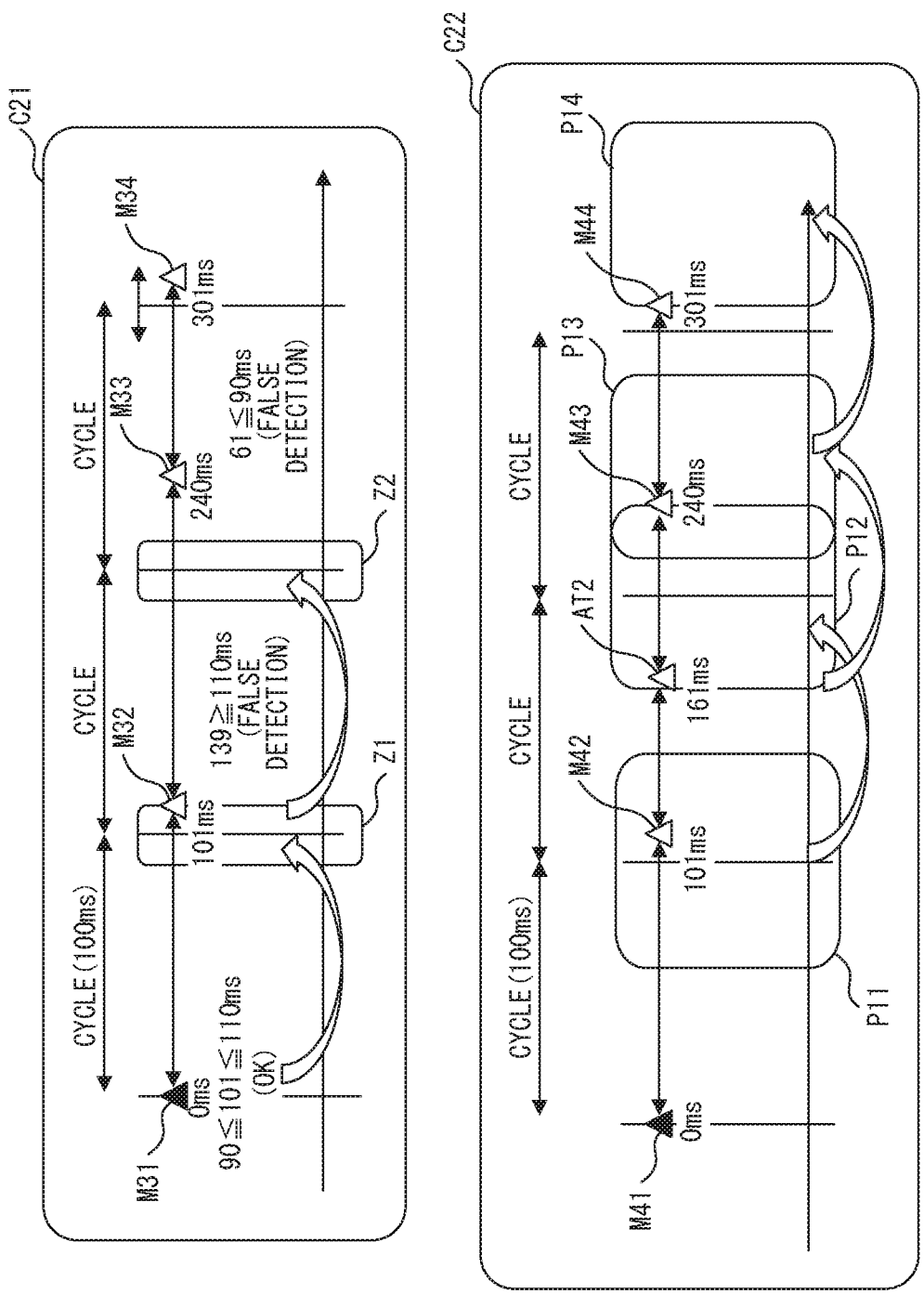
FIG. 12 illustrates a problem that occurs when a margin is not appropriate.

FIG. 12 illustrates an example of a problem that occurs when a margin is not appropriate. In a case C21, it is assumed that every frame includes ID=0x123. In the case C21, a periodic message is transmitted in a 100-ms cycle and a margin is set to 10 ms. It is assumed that the attack detection device 10 receives the first periodic message M31 at 0 ms. Then, using the margin, the attack detection device 10 prepares a time period (Z1) between 90 ms and 110 ms with respect to the reception time of the periodic message M31. It is assumed that the second periodic message M32 is received at 101 ms. Then, the difference in a reception time between the periodic message M31 and the periodic message M32 is 101 ms, and is included in the calculation result obtained using the margin, so the attack detection device 10 decides that the periodic message M32 is not an attack.

Based on the reception time of the periodic message M32, the attack detection device 10 predicts that a time period for receiving the third periodic message is a time period (Z2) between 191 ms and 211 ms.

Next, it is assumed that a transmission timing of the third periodic message M33 is delayed due to transmissions of other messages for example. It is assumed that, due to this delay, the attack detection device 10 receives the third periodic message M33 at 240 ms. In this case, the difference in a reception time between the periodic message M32 and the periodic message M33 is 139 ms, and this is not included in an acceptable range (Z2) when calculation is performed using the margin of ±10 ms. Thus, the attack detection device 10 detects erroneously that the periodic message M33 is an attack. Further, the attack detection device 10 calculates a reception interval with respect to the reception time of the periodic message M33 used as a reference. As indicated in the case C21, when the fourth periodic message is received at 301 ms, the difference in a reception time between the periodic message M33 and the periodic message M34 is 61 ms, so the attack detection device 10 decides that this is not included in the acceptable range when calculation is performed using the margin. Thus, the attack detection device 10 detects erroneously that the periodic message M34 is also an attack.

In order to avoid the erroneous detection in the case C21, the margin may be set to be wider. However, if the margin is set to be wider, an attack may be unnoticed. In a case C22, it is assumed that a periodic message M41, a periodic message M42, a frame AT2 for attack, a periodic message M43, and a periodic message M44 are transmitted as a frame that includes ID=0x123. It is assumed that, in the attack detection device 10, the transmission cycle is set to 100 ms, the margin is set to 40 ms, and the frames are received at the following timing.

Periodic message M41: 0 ms
Periodic message M42: 101 ms
Frame AT2 for attack: 161 ms
Periodic message M43: 240 ms
Periodic message M44: 301 ms In the case C22, the attack detection device 10 decides that an attack has not occurred when the difference in a reception time between two consecutive frames is included in a time period of "transmission cycle±margin". The "transmission cycle±margin" is between 60 ms and 140 ms. When the periodic message M41 is received, the attack detection device 10 predicts the time period P11 as a reception range of the periodic message M42. The reception time of the periodic message M42 is 101 ms from the reception time of the periodic message M41, and this is included in the time period (P11) between 60 ms and 140 ms. Thus, the attack detection device 10 decides that an attack has not occurred.

Next, the attack detection device 10 predicts, as a reception range of the periodic message M43, a time period (P12) between 60 ms and 140 ms that are times elapsed since the reception time of the periodic message M42. When the frame AT2 for attack is received, the attack detection device 10 decides that a frame was received in the time period of P12 because the frame AT2 for attack was received when 60 ms has elapsed since the reception of the periodic message M42. Thus, the attack detection device 10 decides that an attack has not occurred.

The attack detection device 10 predicts, as a reception range of the periodic message M44, a time period (P13) between 60 ms and 140 ms that are times elapsed since the reception time of the frame AT2 for attack. When the periodic message M43 is received, the attack detection device 10 decides that a frame was received in the time period of P13 because the periodic message M43 was received when 79 ms has elapsed since the reception of the frame AT2 for attack. Thus, the attack detection device 10 decides that an attack has not occurred.

Likewise, the attack detection device 10 predicts, as a reception range of the periodic message M45, a time period (P14) between 60 ms and 140 ms that are times elapsed since the reception time of the periodic message M43. When the periodic message M44 is received, the attack detection device 10 decides that a frame was received in the time period of P14 because the periodic message M44 was received when 61 ms has elapsed since the reception of the periodic message M43. Thus, the attack detection device 10 decides that an attack has not occurred. As described above, in the detection method of the case C22, the margin is set to be wider, so the occurrence of an attack by the frame AT2 for attack is unnoticed.

Thus, an attack detection method that can prevent a frame used for attack from being unnoticed and prevent an erroneous detection of an attack even if the margin is made wider is described in the second embodiment.

Figure 13:
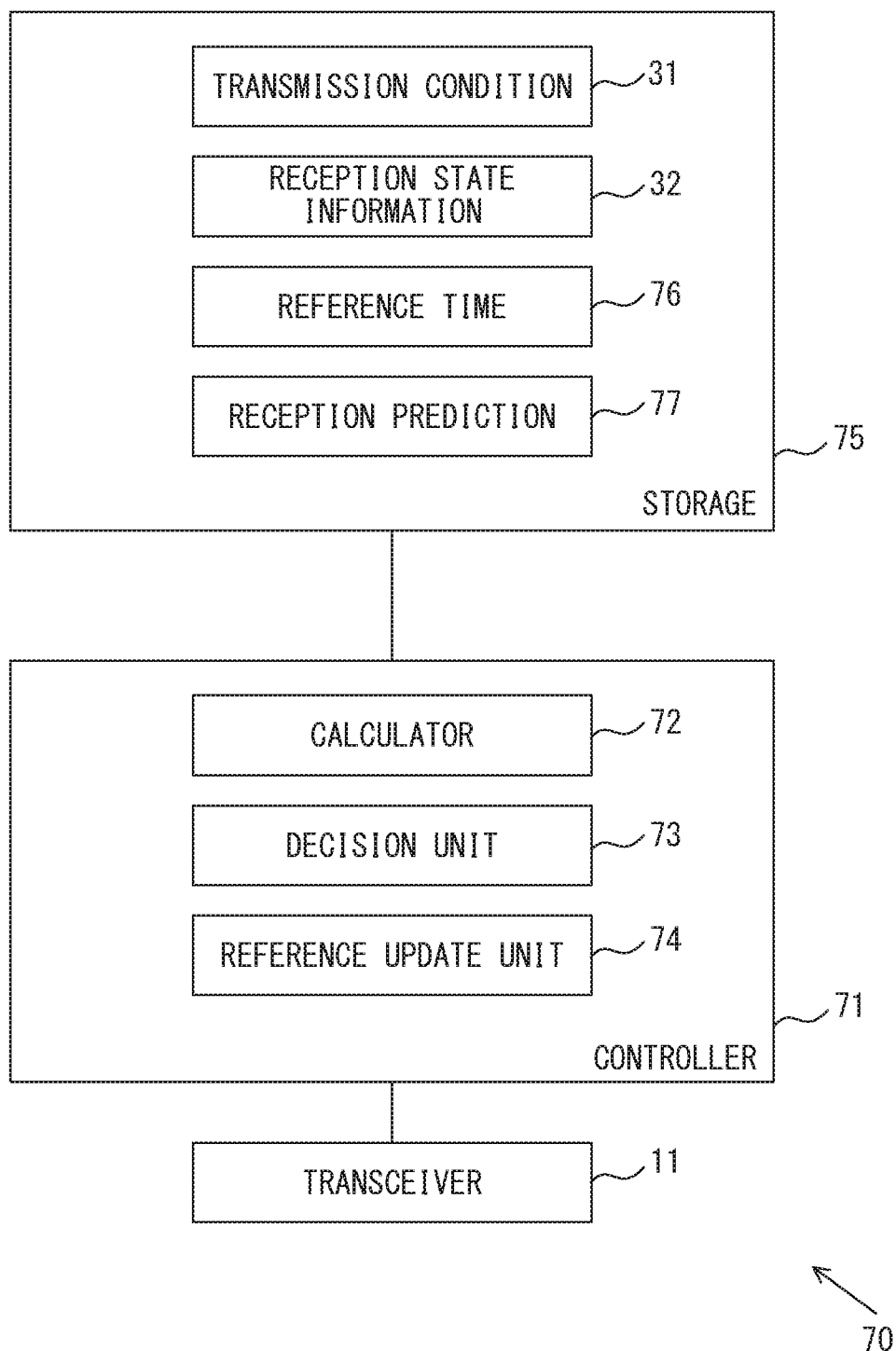
FIG. 13 illustrates another example of the attack detection device.

FIG. 13 illustrates an example of a configuration of an attack detection device 70 according to the second embodiment. The attack detection device 70 includes the transceiver 11, a controller 71, and a storage 75. The controller 71 includes a calculator 72, a decision unit 73, and a reference update unit 74. The storage 75 maintains a reference time 76, a reception prediction 77, and the transmission condition 31, and maintains the reception state information 32 as an option.

The reference update unit 74 selects a message that is used as a reference for a calculation of the reception prediction 77. A message transmitted at a time interval shorter than a transmission cycle is used as the reference for a calculation of the reception prediction 77. Further, the reference update unit 74 may select the reference message from periodic messages in order to overcome the accumulation of an error by updating the reference message regularly. The reference update unit 74 stores a reception time of a message selected as a reference message in the storage 75 as the reference time 76.

The calculator 72 calculates reception predictions for a plurality of periodic messages for each ID using the reference time 76 and the transmission condition 31. The calculator 72 stores the calculation results in the reception prediction 77. Thus, the reception prediction 77 is also generated for each ID. An example of the reception prediction 77 will be described later.

Figure 14:
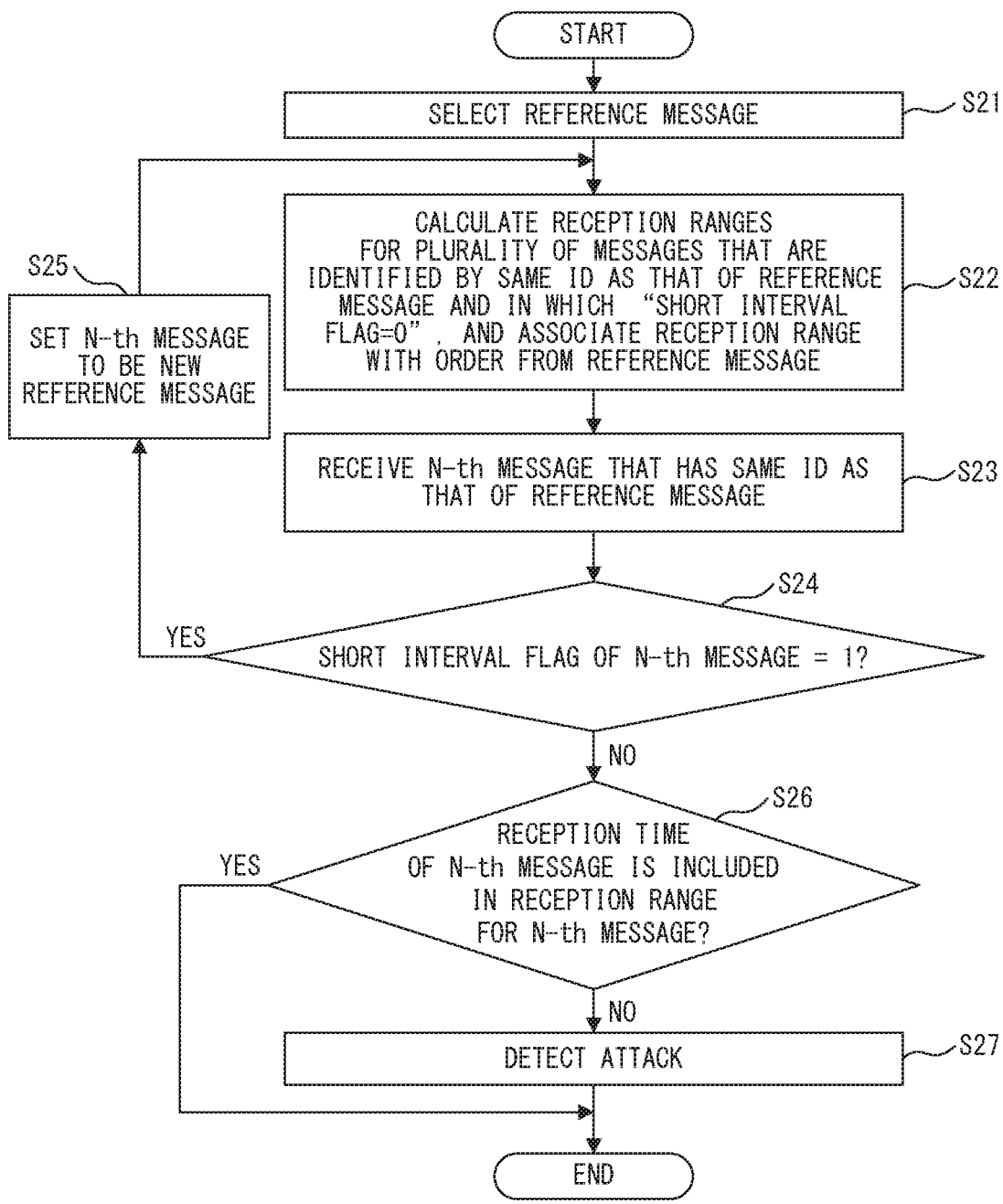
FIG. 14 illustrates an example of an attack detection method according to a second embodiment.
Figure 14:
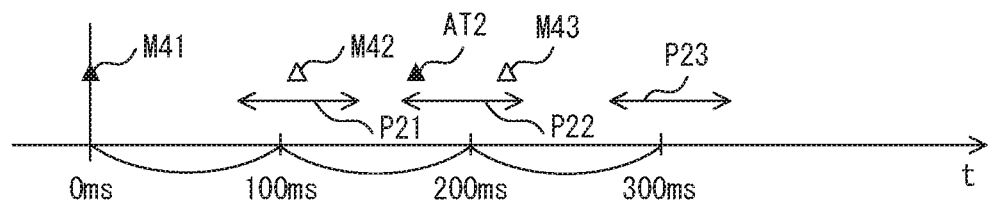

FIG. 14 illustrates an example of an attack detection method according to the second embodiment. The reference update unit 74 selects, as a reference message, a message selected from periodic messages or a message in which "short interval flag"=1 (Step S21). The reference message is used as a reference for predicting reception ranges for other messages including the same ID as that of the reference message. The attack detection device 70 calculates reception ranges for a plurality of messages that are identified by the same ID as that of the reference message and in which "short interval flag"=0, and associates the reception range with an order from the reference message (Step S22). A transmission cycle associated with the ID included in the reference message and a reception time of the reference message are used for the calculation in Step S22.

After that, the transceiver 11 receives the n-th message that has the same ID as that of the reference message (Step S23). The decision unit 73 decides whether the short interval flag of the n-th message is set to 1 (Step S24). When the short interval flag of the n-th message is set to 1, the reference update unit 74 sets the n-th message to be a new reference message, and the process returns to Step S22 (Yes in Step S24, Step S25). When the short interval flag of the n-th message is not set to 1, the decision unit 73 decides whether the reception time of the n-th message is included in a time period predicted as a reception range for the n-th periodic message (No in Step S24, Step S26). When the reception time of the n-th periodic message is not included in the time period predicted as the reception range for the n-th periodic message, the decision unit 73 decides that an attack has been detected (No in Step S26, Step S27).

On the other hand, when the reception time of the n-th periodic message is included in the time period predicted as the reception range for the n-th periodic message, the decision unit 73 decides that an attack has not been detected, and the process is terminated (Yes in Step S26).

As in the case of FIG. 12, FIG. 14 illustrates a case in which the messages M41 to M43 and the frame AT2 for attack are transmitted. Here, it is assumed that the reference update unit 74 selects the message M41 as a reference message. Then, the calculator 72 calculates reception ranges for a plurality of messages in which "short interval flag"=0, using the reception time (0 ms) of the message M41, the transmission cycle (100 ms), and the margin. For example, the first message from the message M41 is predicted to be received in a time period indicated by an arrow P21 when the first message includes "short period flag=0". Likewise, the second message from the message M41 is predicted to be received in a time period indicated by an arrow P22 when the second message includes "short period flag=0", and the third message from the message M41 is predicted to be received in a time period indicated by an arrow P23 when the third message includes "short period flag=0".

After the reception of the message M41, the transceiver 11 receives the message M42. The decision unit 73 treats the message M42 as the first message from the reference message M41. The decision unit 73 does not detect an attack because the message M42 was received in the time period indicated by the arrow P21. Then, the transceiver 11 receives the frame AT2 for attack. The decision unit 73 treats the frame AT2 for attack as the second message from the reference message M41. The decision unit 73 does not detect an attack at this point because the frame AT2 for attack was received in the time period indicated by the arrow P22. After that, the transceiver 11 further receives the message M43. The decision unit 73 treats the message M43 as the third message from the reference message M41. The decision unit 73 detects an attack because the message M43 was not received in the time period indicated by the arrow P23.

As described above, in the methods according to the second embodiment, a reception range for a target message that is received after a plurality of cycles have elapsed since the reception of a message used as a reference is predicted, and how many messages there are between the reference message and the target message of the predicted reception range is taken into consideration, so as to decide whether an attack has occurred. Thus, it is possible to detect an attack even if the margin is set to be wider in order to deal with a message delay.

An example of processing performed in the attack detection device 70 is described in detail below using a specific example of information maintained by the attack detection device 70.

FIG. 15 illustrates an example of information maintained by the attack detection device 70. The attack detection device 70 has stored therein the transmission condition 31. The transmission condition 31 is the same as the transmission condition 31 maintained by the attack detection device 10, and includes an ID that is included in a message to be received, a transmission cycle, a margin, and a position of a short interval flag. The transmission condition 31 of FIG. 15 includes information indicating that a periodic message in which ID=0x123 is transmitted in a 100-ms cycle and information indicating that a 40-ms margin is used for a prediction of a reception range for the periodic message in which ID=0x123. The transmission condition 31 further includes information indicating that, in the message in which ID=0x123, a leading bit of the data field is used as a short interval flag.

A reception time of a message selected as a reference message that is associated with an ID included in the reference message is recorded as the reference time 76. The reference message is a message that is selected from among messages transmitted in a transmission cycle, by the reference update unit 74 as a reference message for a calculation of a reception range or a message transmitted at a time interval shorter than the transmission cycle.

When the reference time 76 has been updated, the calculator 72 generates the reception prediction 77 for each ID using the transmission cycle and the margin that are recorded in the transmission condition 31. FIG. 15 illustrates an example of the reception prediction 77 generated for the periodic message in which ID=0x123. The reference message is received at 50 ms, so when the reference message is the 0th message, a time period (that is, the reception range) in which the n-th received periodic message from the reference message can be received is obtained by "50+100×n±40 (ms)". Thus, the reception range for the periodic message in which ID=0x123 and which is received next after the reference message is between 110 ms and 190 ms. Likewise, the reception range for the second periodic message from the reference message is between 210 ms and 290 ms, and the reception range for the third periodic message from the reference message is between 310 ms and 390 ms. For each periodic message, the calculator 72 associates a reception order from a reference message when the reference message is the 0th message and a reception range with each other, and records them in the reception prediction 77.

Figure 16:
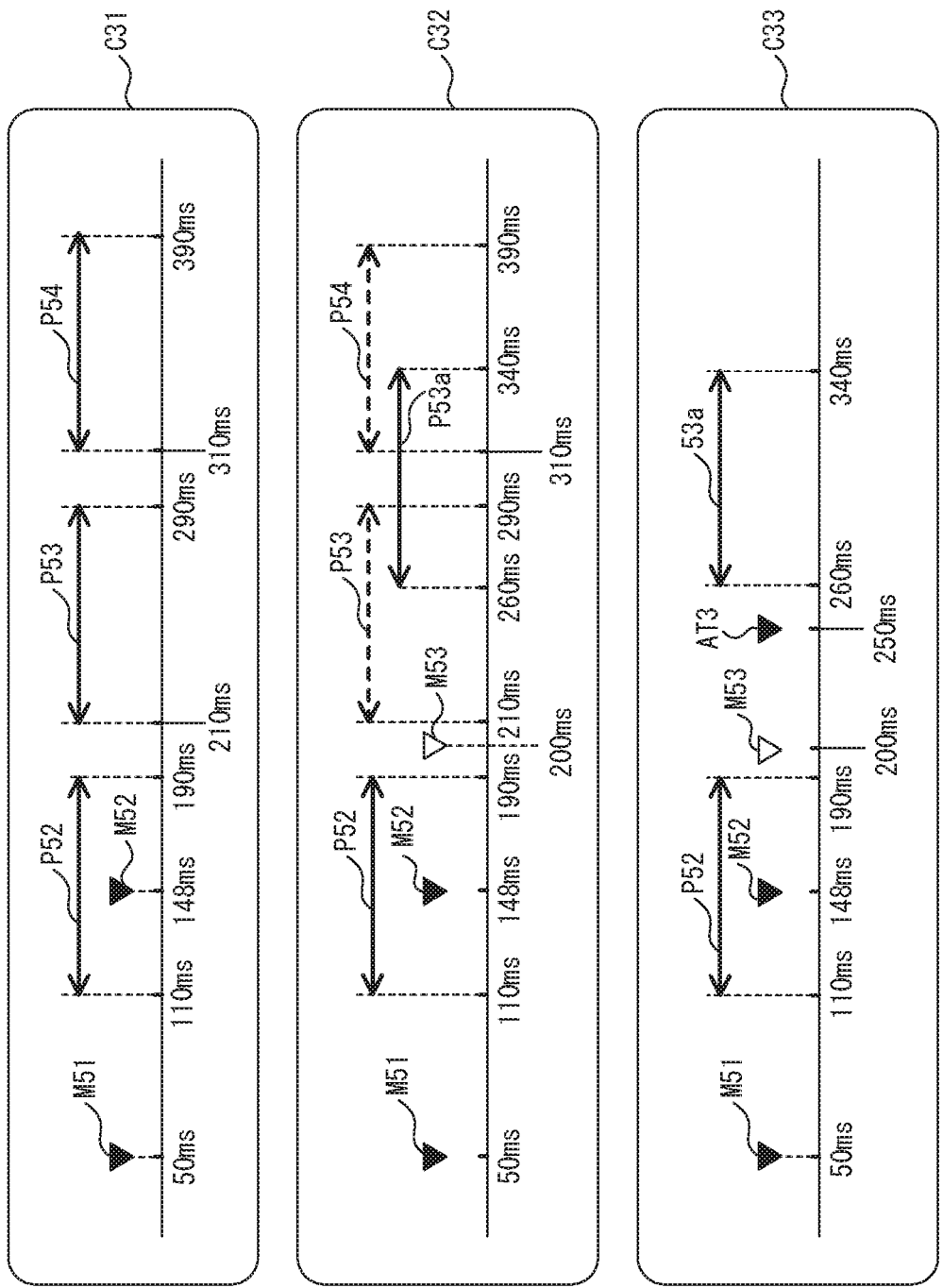
FIG. 16 illustrates an example of an attack detection method according to the second embodiment.

FIG. 16 illustrates an example of an attack detection method according to the second embodiment. An example in which the attack detection device 70 has the information illustrated in FIG. 15 is described below. In FIG. 16, a black triangle (▼) represents a frame in which "short interval flag=0" is set, and a white triangle (▽) represents a frame in which "short interval flag=1" is set. Further, it is assumed that the reference update unit 74 is configured to change the reference message when ten messages in which "short interval flag"=0 are received without changing the reference message, in addition to when a message in which "short interval flag"=1 is received.

A case C31 is an example in which the attack detection device 70 receives a message M51 at 50 ms and the message M51 is selected as a reference message. The controller 71 calculates, in the procedure described with reference to FIG. 15, a reception range for the message in which "short interval flag"=0 when the message M51 is used as a reference and stores the calculated reception range as the reception prediction 77. Calculation values of reception ranges for the first to third messages from the message M51 are represented in the case C31. An arrow P52 indicates the reception range for the first message from the message M51, an arrow P53 indicates the reception range for the second message from the message M51, and an arrow P54 indicates the reception range for the third message from the message M51.

The transceiver 11 receives a message M52 at 148 ms. When the decision unit 73 has confirmed that the short interval flag of the message M52 is set to 0, the decision unit 73 decides whether the message M52 was received in a predicted time period for the first message. In this example, the reception time of the message M52 is 148 ms and the reception range for a message that is the first message from the message M51 and in which "short interval flag"=0 is between 110 ms and 190 ms. Thus the decision unit 73 decides that the message M52 was received in the predicted time period and does not detect an attack. The message M52 is a message that is the first message from the message M51 and in which "short interval flag"=0, so the calculator 72 does not update the reception ranges for the messages received after the message M52.

In a case C32, the transceiver 11 receives a message M53 at 200 ms. The decision unit 73 detects that the short interval flag of the message M53 is set to 1. Then, the reference update unit 74 sets the message M53 to be a new reference message and discards the reception range calculated when the message M51 is used as a reference. That is, reception ranges indicated by arrows P53 and P54 that are calculated in the case C31 when the message M51 is used as a reference are discarded. The reference update unit 74 sets the reception time of the message M53 to be the reference time 76, wherein the arrows P53 and P54 are illustrated by using dashed arrows in the case C32. The reference time 76 has been updated, so the calculator 72 updates the reception prediction 77 with a reception range that is calculated when the message M53 is used as a reference. The reception time of the message M53 is 200 ms, so using the transmission condition 31 (of FIG. 15), the calculator 72 calculates "200+1×100±40 (ms)=between 260 ms and 340 ms" to obtain a reception range for a message that is the first received message from the message M53 and in which "short interval flag"=0. The calculator 72 also calculates reception ranges for subsequent messages by the similar processing. An example of the reception range that is calculated when the message M53 is used as a new reference message is indicated by an arrow 53a.

In a case C33, it is assumed that the transceiver 11 receives a frame AT3 for attack at 250 ms. When the decision unit 73 detects that the short interval flag of the frame AT3 for attack is set to 0, the decision unit 73 decides whether the frame AT3 for attack was received in a predicted time period. The decision unit 73 treats the frame AT3 for attack as the first message from the reference message M53. In this case, the reception time of the frame AT3 for attack is 250 ms and the reception range for a message that is the first message from the message M53 and in which "short interval flag"=0 is between 260 ms and 340 ms. Thus the decision unit 73 decides that the frame AT3 for attack was not received in the predicted time period and decides that an attack has been detected.

Figure 17:
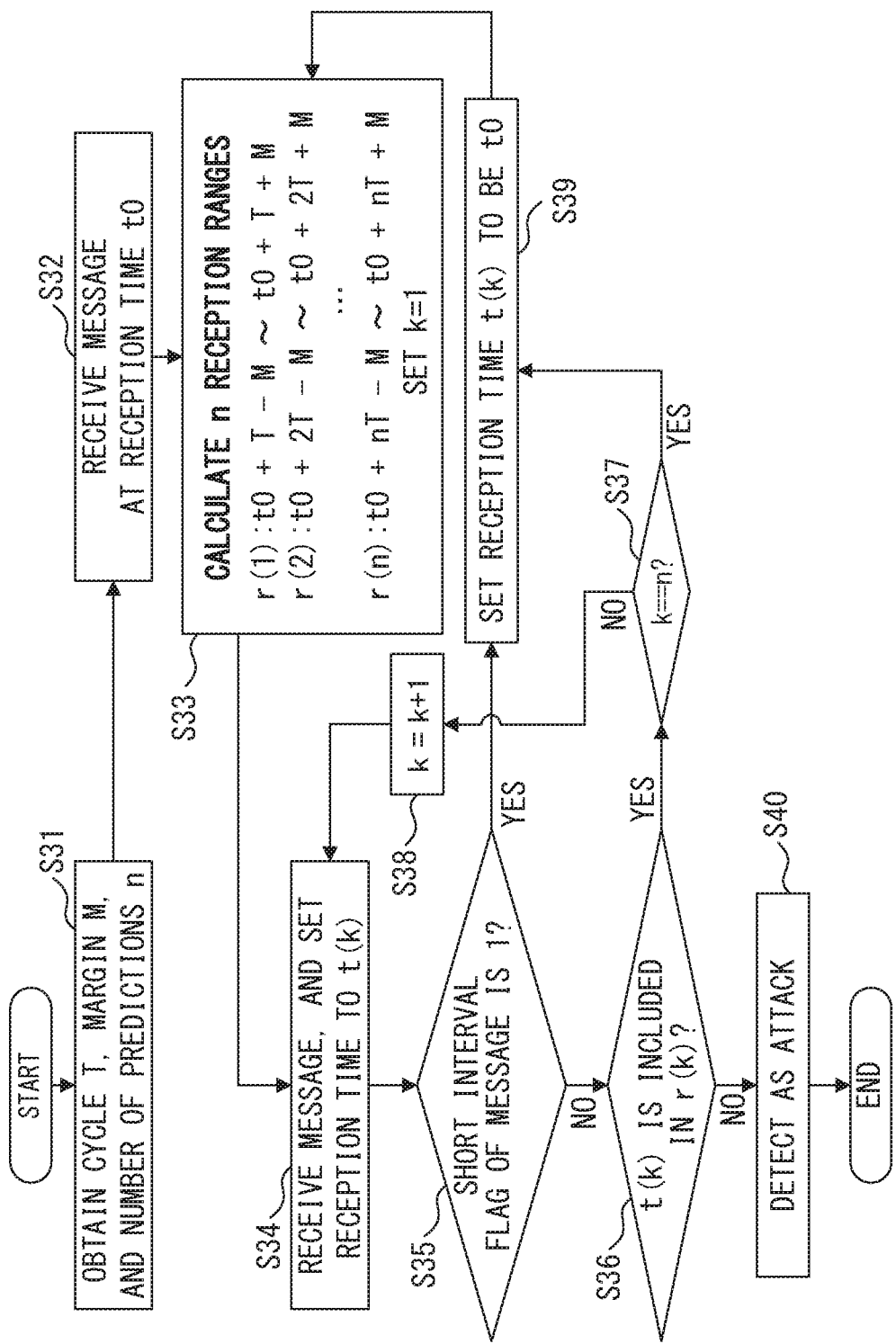
FIG. 17 is a flowchart that illustrates an example of processing performed in the attack detection device according to the second embodiment.

FIG. 17 is a flowchart that illustrates an example of the processing performed in the attack detection device 70. In FIG. 17, a variable k is used to count the number of messages on which processing is performed without changing a reference message.

The calculator 72 obtains a transmission cycle T, a margin M, and the number of predictions n (Step S31). Here, the calculator 72 reads the transmission cycle T and the margin M from the transmission condition 31. The number of predictions n is a maximum number of messages in which "short interval flag"=0 and on which decision processing is performed without changing a reference message. After that, the transceiver 11 receives a message. When a message is received after the attack detection device 70 is started, the reference update unit 74 sets the first received message to be a reference message and sets the reception time of the first received message to t0 (Step S32).

In Step S33, using the reception time t0 and the information obtained in Step S31, the calculator 72 calculates reception ranges for n messages when all of the n messages are transmitted in the transmission cycle. Here, a reception range of the xth message is calculated by "r(x)=t0+xT±M". Further, the reference update unit 74 sets the variable k to 1.

The transceiver 11 further receives a message. The decision unit 73 sets the reception time of the message to t(k) (Step S34). The decision unit 73 decides whether the short interval flag of the received message is set to 1 (Step S35). The received message is transmitted in the transmission cycle when the short interval flag of the received message is not set to 1, so the decision unit 73 decides whether t(k) is included in r(k) (No in Step S35, Step S36). When t(k) is not included in r(k), the decision unit 73 decides that there has been an attack (No in Step S36, Step S40).

On the other hand, when t(k) is included in r(k), the reference update unit 74 decides whether the variable k is equal to the number of predictions n (Yes in Step S36, Step S37). Note that the variable k becomes n when n periodic messages are consecutively transmitted and reception times of them are respectively included in corresponding reception ranges. When the variable k is less than the number of predictions n, the variable k is not equal to the number of predictions n (No in Step S37). In this case, the reference update unit 74 increments the variable k by one, and the process returns to Step S34 (Step S38). When the variable k has become equal to the number of predictions n as a result of performing the processes Steps S34-S38 repeatedly, the reference update unit 74 updates the reference message with the received message, and sets the reception time t(k) to be a reception time t(0) of the reference message (Yes in Step S37, Step S39). Here, the reference update unit 74 updates the reference time 76. Then, the process of Step S33 is performed. In other words, using the updated reference time 76, the calculator 72 calculates reception ranges for n messages to be transmitted in a transmission cycle after the new reference message. Further, the reference update unit 74 updates the variable k to 1.

When the short interval flag of the received message is set to 1, the reference update unit 74 updates the reference message to the received message, and sets the reception time t(k) to be a reception time t(0) of the reference message (Yes in Step S35, Step S39). After that, the process moves to Step S33.

Figure 18:
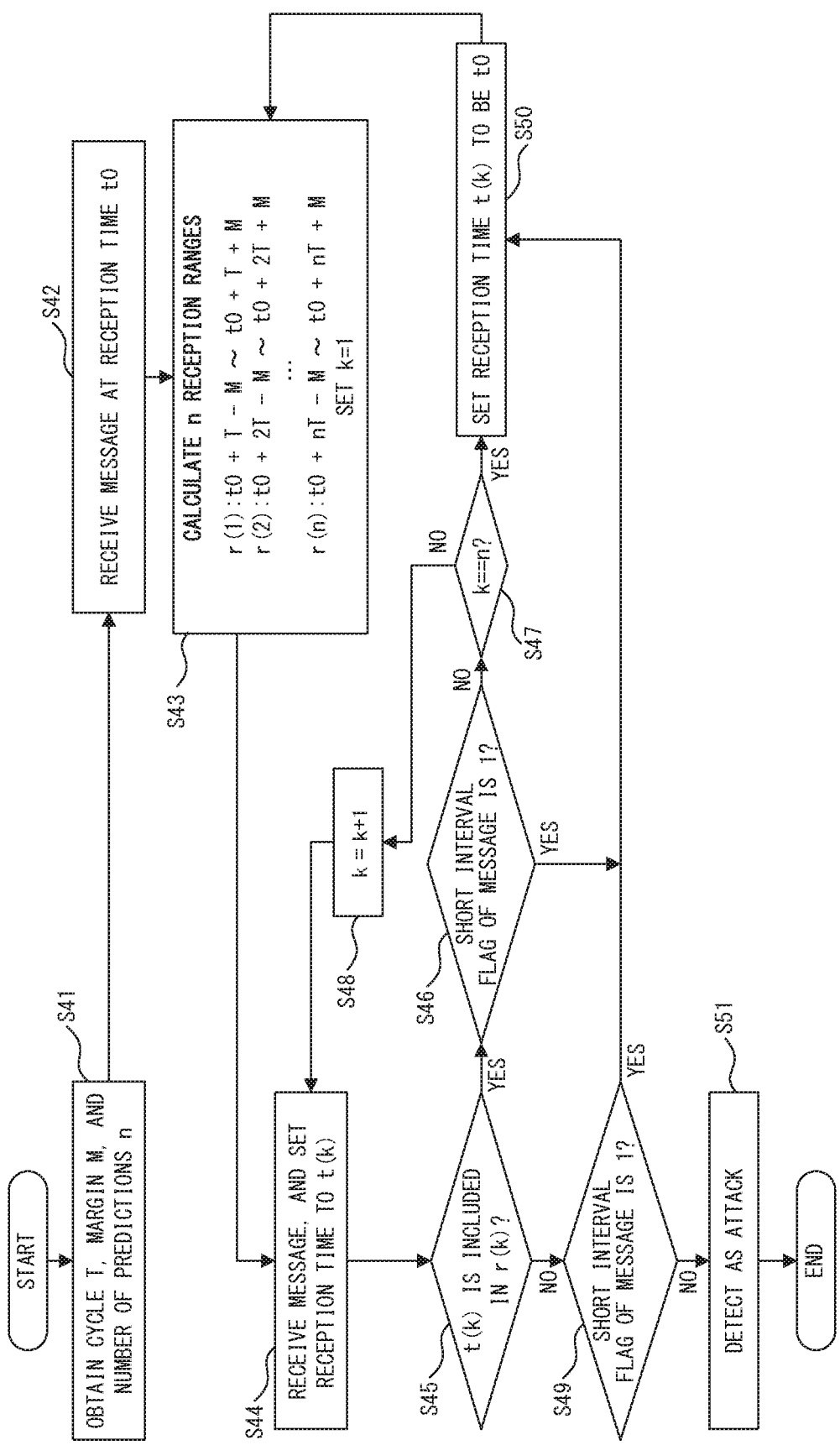
FIG. 18 is a flowchart that illustrates another example of the processing performed in the attack detection device according to the second embodiment.

FIG. 18 is a flowchart that illustrates a variation of the processing performed in the attack detection device 70 according to the second embodiment. In FIG. 18, the decision of whether the reception time of a message is included in a reception range is performed before the value of a short interval flag is detected.

The processes of Steps S41 to S44 are substantially the same as the processes of Steps S31 to S34 described with reference to FIG. 17. In Step S45, the decision unit 73 decides whether t(k) is included in r(k). When t(k) is not included in r(k), the decision unit 73 decides whether the short interval flag of the received message is set to 1 (No in Step S45, Step S49). When the short interval flag of the received message is not set to 1, the decision unit 73 decides that there has been an attack (No in Step S49, Step S51).

On the other hand, when the short interval flag of the received message is set to 1, the decision unit 73 updates the reference message to the received message, and sets the reception time t(k) to be a reception time t(0) of the reference message (Yes in Step S49, Step S50). Here, the reference update unit 74 updates the reference time 76 and the process moves to Step S43.

When the decision unit 73 has decided in Step S45 that t(k) is included in r(k), the decision unit 73 also decides whether the short interval flag of the received message is set to 1 (Yes in Step S45, Step S46). When the short interval flag of the received message is set to 1, the decision unit 73 updates the reference message to the received message, and sets the reception time t(k) to be a reception time t(0) of the reference message (Yes in Step S46, Step S50).

When it has been decided that t(k) is included in r(k) and that the short interval flag of the received message is not set to 1, the reference update unit 74 decides whether the variable k is equal to the number of predictions n (No in Step S46, Step S47). When the variable k is less than the number of predictions n, the variable k is not equal to the number of predictions n (No in Step S47). In this case, the reference update unit 74 increments the variable k by one, and the process returns to Step S44 (Step S48). When the variable k has become equal to the number of predictions n as a result of performing the processes of Steps S44-S48 repeatedly, the reference update unit 74 updates the reference message to the received message, and sets the reception time t(k) to be a reception time t(0) of the reference message (Yes in Step S47, Step S50). After the process of Step S50, the process moves to Step S43.

As described above, also in the method according to the second embodiment, the attack detection device 70 can decide, using a short interval flag, whether a received message is a message transmitted from the transmission device at a time interval shorter than a transmission cycle. Further, the attack detection device 70 predicts a reception time of a message received in a next cycle, using a message selected from messages received in a predicted reception range or a message that has been confirmed to be a message transmitted at a time interval shorter than the transmission cycle. Thus, the method according to the second embodiment can also be applied to both a system in which a time that is used as a reference for a transmission cycle for a periodic message is changed according to a transmission time of an aperiodic message and a system in which a time that is used as a reference for a transmission cycle for a periodic message is not changed according to an aperiodic message.

Further, in the second embodiment, an erroneous detection can be prevented by setting a margin to be wider. Here, reception ranges for a plurality of messages that are transmitted in a transmission cycle after the transmission of a message used as a reference are predicted, and the reception order of the plurality of messages of the predicted reception ranges from the reference message is taken into consideration, so that the attack detection device 70 can prevent an attack from being unnoticed. Thus, the second embodiment improves an accuracy in attack detection performed in a system in which both a data frame transmitted periodically and a data frame not transmitted periodically are transmitted.

Others

The embodiments are not limited to the examples described above, and various modifications may be made thereto. Some other examples will be described below.

The examples in which a value of a leading bit of data is used have been described above, and the position of information used as a short interval flag is an arbitrary position in the data field. Further, a plurality of bits may be used as a short interval flag. In this case, the transmission device 40 may increment a value of a region used as a short interval flag when the transmission device 40 transmits a frame at a time interval shorter than a transmission cycle. Likewise, the transmission device 40 may decrement a value of a region used as a short interval flag when the transmission device 40 transmits a frame at a time interval shorter than a transmission cycle. Further, the transmission device 40 may change a value of a region used as a short interval flag when the transmission device 40 transmits a frame at a time interval shorter than a transmission cycle. In this case, the transmission device 40 does not change the value of a region used as a short interval flag when the transmission device 40 transmits the frame at the same time interval as the transmission cycle. For example, the decision unit 22 in the attack detection device 10 and the decision unit 73 in the attack detection device 70 have stored therein a value of a short interval flag in a previously received message, and decide whether a newly received message was transmitted in a transmission cycle by comparing a value of a short interval flag of the newly received message with the value of the short interval flag of the previously received message. In this example, it is decided that the newly received message was transmitted in the transmission cycle if the two values are the same as each other.

Further, the decision unit 73 may use, as a short interval flag, information indicating that the transmission cycle is changed in a specified flow with a pre-associated ID. For example, when a message including ID=0x123 is always received after a certain time period has elapsed since the reception of a message including ID=0x110, the decision unit 73 may decide that the transmission was performed at a short time interval when the message including ID=0x123 is received at a timing out of range of "certain time period±margin" after the reception of the message including ID=0x110. Here, it is assumed that the decision unit 73 monitors the transmission cycle for the message in which ID=0x110. In this case, the decision unit 73 may decide that the message including ID=0x123 which is received just after the occurrence of a change in the transmission cycle for the message in which ID=0x110 was transmitted at a time interval shorter than the transmission cycle. Further, when a specific region in data of the message including ID=0x110 is used as a short interval flag and "short interval flag=1" is set in the message including ID=0x110, the decision unit 73 may decide that the message including ID=0x123 was transmitted at a time interval shorter than the transmission cycle.

Further, the decision unit 73 may use, as a substitute for a short interval flag, a state of, for example, a vehicle provided with a CAN or a state of a connection between the CAN and an external device.

A plurality of these conditions may be used at the same time. In this case, a plurality of different AND conditions or an OR condition may be used.

The examples in which the attack detection device (10, 70) and the transmission 40 are different devices have been described, but one device may operate as the attack detection device 10,70 for a certain ID and may operate as the transmission device 40 for another ID. In this case, a device that detects an attack and transmits a message serves as both the attack detection device 10 and the transmission device 40, so the device includes the transceiver 11, the controller 20, the storage 30, the controller 50, and the storage 60. Further, the device which operates as both the attack detection device 70 and the transmission device 40 includes the transceiver 11, the controller 71, the storage 75, the controller 50, and the storage 60. The methods disclosed in the present invention can be applied to an extended configuration that is called a CAN-FD (CAN with flexible data rate).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An attack detection device comprising:
   a transceiver configured to receive a message from a communication device in a network; and
   a processor configured to calculate, according to a reception time of a first message in periodic messages that are periodically transmitted in a specified transmission cycle in the network, a reception range for a target message in the periodic messages that are received after the first message by the transceiver, wherein
   when the transceiver receives a second message outside of the reception range after the reception time of the first message, the processor determines whether the second message includes information indicating that the second message has been transmitted at a time interval shorter than the transmission cycle, and
   when the second message includes the information indicating that the second message has been transmitted at a time interval shorter than the transmission cycle, the processor updates the reception range for a target message in the periodic messages that are received after the second message by the transceiver according to a reception time of the second message and the transmission cycle.

2. The attack detection device according to claim 1, wherein
   each message transmitted from the communication device includes a flag indicating whether the message is transmitted at a time interval shorter than the transmission cycle or the message is transmitted at a time interval equal to the transmission cycle, and
   the processor decides that an attack on the network has occurred when the flag included in a target message indicates that the target message is transmitted at the time interval equal to the transmission cycle and a reception time of the target message is not included in the reception range.

3. The attack detection device according to claim 2, wherein
   the processor calculates reception range respectively in association with a plurality of periodic messages transmitted after the second message, using the reception time of the second message as a reference, and
   the processor decides that an attack on the network has occurred when a reception time of a target message in the plurality of periodic messages transmitted after the second message is not included in the reception range which is calculated in association with the target message.

4. An attack detection method performed by an attack detection device, the method comprising:
   receiving a message from a communication device in a network;
   calculating, according to a reception time of a first message in periodic messages that are periodically transmitted in a specified transmission cycle in the network, a reception range for a target message in the periodic messages that are received after the first message; and
   when a second message is received outside of the reception range after the reception time of the first message, determining whether the second message includes information indicating that the second message has been transmitted at a time interval shorter than the transmission cycle, and
   when the second message including the information indicating that the second message has been transmitted at a time interval shorter than the transmission cycle, updating the reception range for a target message in the periodic messages that are received after the second message according to a reception time of the second message and the transmission cycle.

5. The attack detection method according to claim 4, wherein
   each message transmitted from the communication device includes a flag indicating whether the message is transmitted at a time interval shorter than the transmission cycle or the message is transmitted at a time interval equal to the transmission cycle, and
   the attack detection device decides that an attack on the network has occurred when the flag included in a target message indicates that the target message is transmitted at the time interval equal to the transmission cycle and a reception time of the target message is not included in the reception range.

6. The attack detection method according to claim 5, wherein
   the attack detection device
      calculates reception ranges respectively in association with a plurality of periodic messages transmitted after the second message, using the second message as a reference, and
      decides that an attack on the network has occurred when a reception time of a target message in the plurality of periodic messages transmitted after the second message is not included in the reception range which is calculated in association with the target message.

7. A non-transitory computer-readable recording medium having stored therein an attack detection program that causes a processor implemented in an attack detection device to execute an attack detection process, the process comprising:
   receiving a message from a communication device in a network via a transceiver implemented in the attack detection device;
   calculating, according to a reception time of a first message in periodic messages that are periodically transmitted in a specified transmission cycle in the network, a reception range for a target message in the periodic messages that are received after the first message; and
   when a second message is received outside of the reception range after the reception time of the first message, determining whether the second message includes information indicating that the second message has been transmitted at a time interval shorter than the transmission cycle, and when the second message includes the information indicating that the second message has been transmitted at a time interval shorter than the transmission cycle, updating the reception range for a target message in the periodic messages that are received after the second message according to a reception time of the second message and the transmission cycle.

8. The non-transitory computer-readable recording medium according to claim 7, wherein
each message transmitted from the communication device includes a flag indicating whether the message is transmitted at a time interval shorter than the transmission cycle or the message is transmitted at a time interval equal to the transmission cycle, and
the process decides that an attack on the network has occurred when the flag included in a target message indicates that the target message is transmitted at the time interval equal to the transmission cycle and a reception time of the target message is not included in the reception range.

9. The non-transitory computer-readable recording medium according to claim 8, wherein
the process
calculates reception ranges respectively in association with a plurality of periodic messages transmitted after the second message, using the second message as a reference, and
decides that an attack on the network has occurred when a reception time of a target message in the plurality of periodic messages transmitted after the second message is not included in the reception range which is calculated in association with the target message.

* * * * *